United States Patent [19]
Yang

[11] Patent Number: 4,677,365
[45] Date of Patent: Jun. 30, 1987

[54] AUTOMOTIVE CHARGING SYSTEM HAVING GENERATOR WITH MULTIPLE WINDINGS AND REGULATORS

[76] Inventor: Tai-Her Yang, 5-1 Tay Pyng Street, Shi Hwu Jenn, Jang Huah Shiann, Taiwan

[21] Appl. No.: 783,961

[22] Filed: Oct. 4, 1985

Related U.S. Application Data

[60] Division of Ser. No. 648,346, Sep. 6, 1984, Pat. No. 4,562,894, which is a continuation of Ser. No. 345,945, Feb. 3, 1982, abandoned.

[51] Int. Cl.⁴ .............................................. H02J 7/14
[52] U.S. Cl. .............................. 322/90; 320/DIG. 2; 320/59; 322/94
[58] Field of Search ............................ 322/89, 90, 94; 320/DIG. 2, 59

[56] References Cited

U.S. PATENT DOCUMENTS

| 3,369,170 | 2/1908 | Custer | 322/89 X |
| 3,469,175 | 9/1969 | Kirk | 320/DIG. 2 UX |
| 3,495,155 | 2/1970 | Maier | 322/95 X |
| 3,636,434 | 1/1972 | Beuk et al. | 322/94 X |
| 4,342,955 | 8/1982 | Gant | 322/90 X |

Primary Examiner—R. J. Hickey
Attorney, Agent, or Firm—Cushman, Darby & Cushman

[57] ABSTRACT

An automotive battery charging circuit with a generator having a field winding and a plurality of stator windings, the output of the stator windings being connected to the battery through a plurality of SCR's each having individual potentiometer control means responsive to a voltage differential of the associated stator winding and the battery voltage.

7 Claims, 34 Drawing Figures

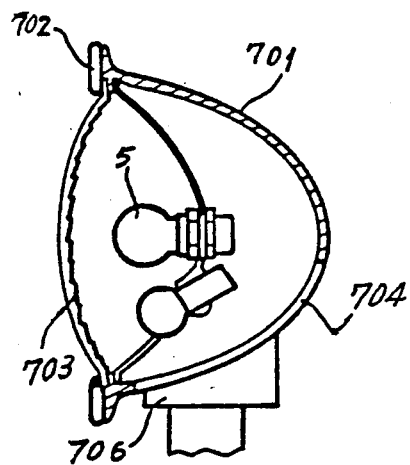
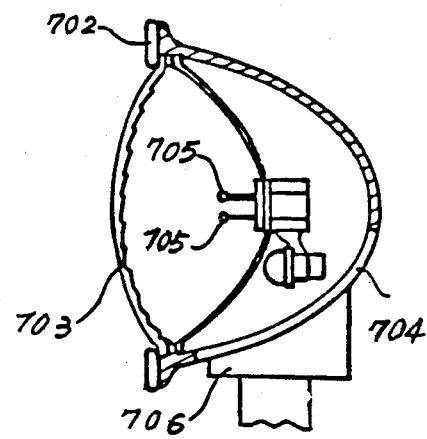
Fig. 19-1    Fig.19-2
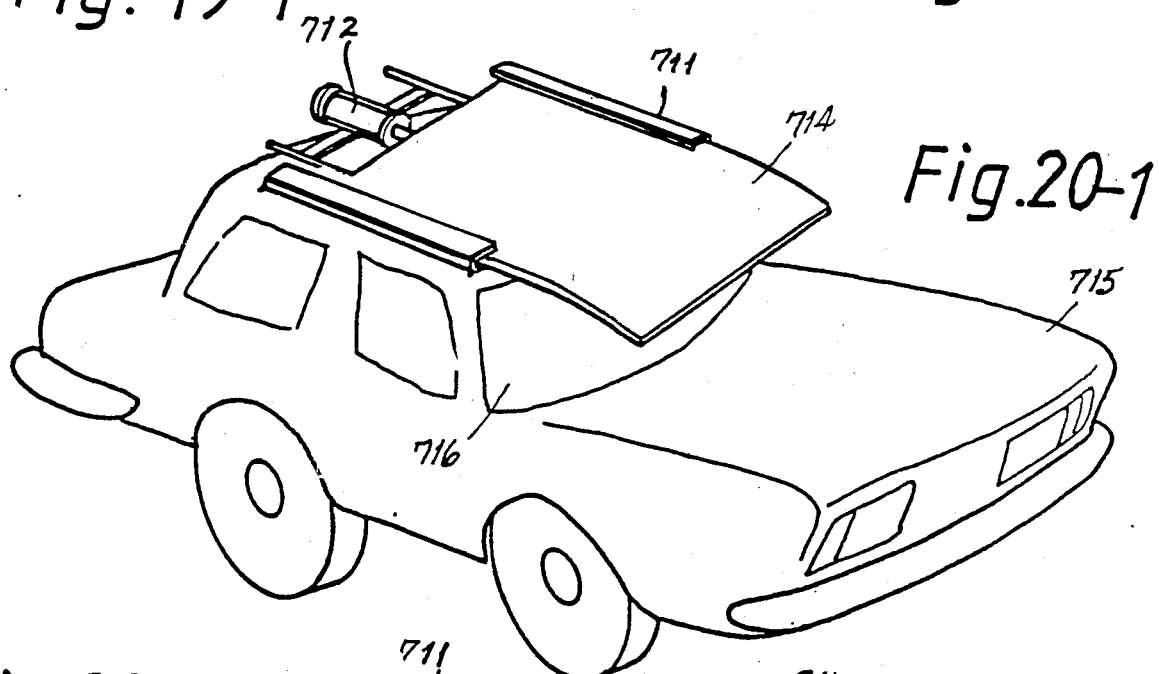
Fig.20-1
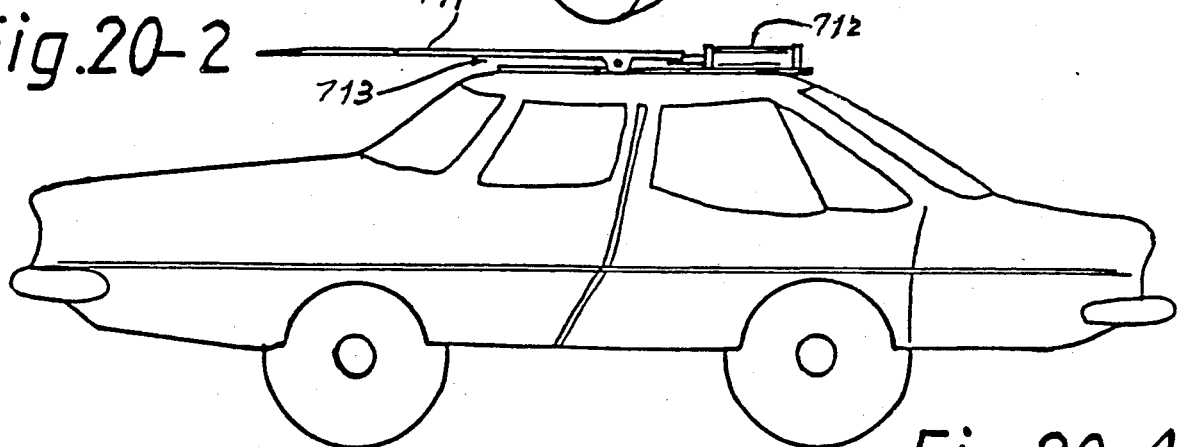
Fig.20-2
Fig.20-3    Fig.20-4

AUTOMOTIVE CHARGING SYSTEM HAVING GENERATOR WITH MULTIPLE WINDINGS AND REGULATORS

This is a division of application Ser. No. 648,346, now U.S. Pat. No. 4,562,894, filed Sept. 6, 1984, which is a Rule 62 Continuation Application of Ser. No. 345,945, filed Feb. 3, 1982, now abandoned.

FIELD OF THE INVENTION

This invention relates to a differential coupling multi-driving system, and in particular to a differential coupling multi-driving system used for driving a vehicle such as a car, ship, or flying machine.

Conventional vehicles often employ rotary driving systems using an internal combustion engine. Due to recent increases in oil prices as well as to noise and air pollution problems, electrical driving systems have been used to replace the internal combustion engine in some vehicles. Unfortunately, such electrically-driven vehicles have limited range and speed capabilities because of the limited power capacity and the large weight and volume of conventional electrical batteries.

Another alternative is to use an internal combustion engine driven at a constant speed to drive a generator to charge the batteries used to provide power to the electrical driving motor of the vehicle. This method increases efficiency, but still adds to noise and air pollution. Yet another method used is to provide a vehicle with both an internal combustion engine and an electrical motor, the outputs of which may be used either separately or simultaneously. However, this method has previously been undesirable because of the high manufacturing cost and the great bulk of the resulting driving system.

SUMMARY OF THE INVENTION

The present invention is a differential coupling multi-driving system which has the advantages of prior multi-drive systems without the great bulk of such prior systems. In addition, the present invention also includes transmission functions.

The rotary output axle of an internal combustion engine powered by conventional fuel (such as gasoline, diesel oil, alcohol or gas) is coupled to the input axle of an electromagnetic multi-driving device. The multi-driving device includes an electric motor, an output shaft, gears, and electromagnetic brakes, and is controlled by an electronic control device. In one mode of operation, the multi-driving device couples the rotational output of the internal combustion engine to an output shaft. In another mode of operation, the multi-driving device couples the output of the rotary drive mechanism operated as an electric motor to the output shaft. In another mode of operation, the rotational outputs of both the rotary drive mechanism and the internal combustion engine are coupled to the output shaft. In yet another mode of operation, the rotational output of the rotary drive mechanism is coupled to the output shaft of the internal combustion engine to start the engine. In another mode of operation, the output of the internal combustion engine is used to drive the rotary drive mechanism so that it may act as a generator to produce electrical power. The rotary drive mechanism may also be used as a regenerative braking device.

BRIEF DESCRIPTION OF THE DRAWINGS

FIG. 11-1 is a side perspective view of a bumper in accordance with the present invention;

FIG. 11-2 is a detailed side view of the bumper shown in FIG. 11-1;

FIG. 11-3 is a sectional side view of a bumper actuating cylinder shown in FIG. 11-2;

FIG. 12-1 is an elevated perspective view of another embodiment of a bumper in accordance with the present invention installed on a truck;

FIG. 12-2 is an elevated perspective view of the embodiment of a bumper shown in FIG. 12-1 installed on a car;

FIG. 18-1 is an elevated perspective view of a car equipped with two lamps positioned on the front hood and facing rearwards, in accordance with the present invention;

FIG. 18-2 is an elevated perspective view of a car equipped with a lamp positioned on the roof facing downwards, in accordance with the present invention;

FIG. 18-3 is an elevated perspective view of a car equipped with a lamp on the rear facing rearwards, in accordance with the present invention;

FIG. 18-4 is a side elevated view of a car equipped with an embodiment of a lamp in accordance with the present invention;

FIG. 19-1 is a sectional side view of the embodiment of a lamp shown in FIG. 18-4;

FIG. 19-2 is a sectional side view of a second embodiment of a lamp in accordance with the present invention;

FIG. 20-1 is an elevated perspective view of a vehicle equipped with an embodiment of a movable extension top in accordance with the present invention;

FIG. 20-2 is a side elevated view of the movable extension top of FIG. 20-1;

FIG. 20-3 is a sectional side view of an embodiment of an actuator for the movable extension top shown in FIG. 20-1;

FIG. 20-4 is a sectional view of another embodiment of an actuator for the multi-layer extension top shown in FIG. 20-1;

DETAILED DESCRIPTION OF THE PREFERRED EMBODIMENTS DIFFERENTIAL COUPLING MULTI-DRIVING SYSTEM

Figure 1:
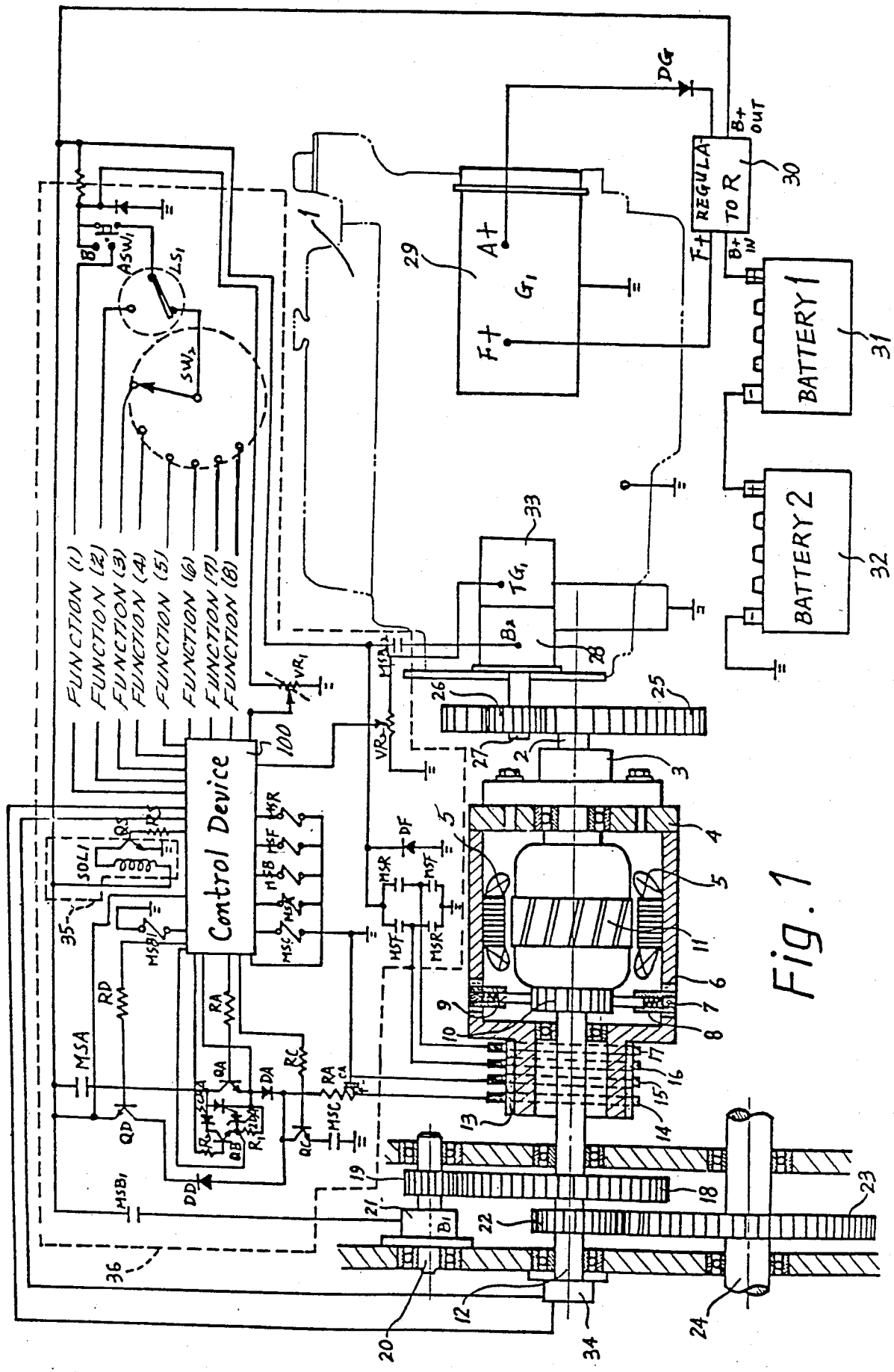
FIG. 1 is a schematic illustration of a presently preferred embodiment of a multi-driving system in accordance with the present invention.

Referring to FIG. 1, shown is a presently preferred embodiment of a series-coupled multi-driving system in accordance with the present invention. An internal combustion engine 1, which uses conventional fuel (such as gasoline, diesel oil, alcohol or gas) generates a rotational output at rotary output axle 2. A wheel-shaped output shaft may be used. Rotary output axle 2 is coupled by coupler 3 to rotary drive mechanism 4. Coupler 3 may comprise any conventional axle-to-axle or axle-to-coaxle coupler (such as gears, belts, sprockets or a universal joint).

Rotary drive mechanism 4 may include a bearing and a fixed mechanical structure at one or both ends for supporting the mechanism. Rotary drive mechanism 4 includes an armature 11, which may be a cylinder-shaped D.C. armature with a conventional winding and a tooth-shaped iron core. Alternatively, armature 11 may include a printing-type armature rotor, a cup-shaped armature rotor, an armature rotor without an iron core, or any other conventional D.C. armature rotor. An output axle 12 is coupled to armature 11.

Mounted inside of rotary drive mechanism 4 are two stator excitation windings 5. Excitation windings 5 are controlled by a controller 36, and generate a magnetic field corresponding to the strength of the input D.C. current provided to the windings through conductive rings 16 and 17. Alternatively, a permanent magnet may be used for producing the magnetic field in rotary drive mechanism 4.

Mounted to rotary drive mechanism 4 is a brush seat insulating sleeve 6, to which is connected a brush seat insulating lid 7. A brush seat 8 supports brushes 9, which are in contact with a rotary armature commutator 10. Rotary armature commutator 10 is suitably cylindrical in shape, and is in contact with two of brushes 9, the brushes being installed at different sides of the commutator.

An insulated slip ring bushing 13 is provided on rotary drive mechanism 4. Four slip rings 14, 15, 16 and 17 are mounted onto bushing 13. Armature output/input slip rings 14 and 15 are connected to the output and the input of brush seats 8. Magnetic field input/output slip rings 16 and 17 are separately connected to the ends of stator excitation windings 5 (previously described).

A brake gear 18 is fixedly mounted on output shaft 12 by conventional means (such as a key or a pin). Brake gear 18 is engaged with a brake gear 19, brake gear 19 being fixedly mounted onto a shaft 20 by conventional means (such as a key or a pin). An electromagnetic brake 21 is connected to shaft 20 (by a key, a pin, etc.), and will produce braking torque when energized. Electromagnetic brake 21 may be replaced by a mechanical brake, which may be operated either manually or hydraulically, depending upon user requirements.

A transmission gear 22 is fixedly mounted to shaft 12 by conventional means (such as a key or a pin). Transmission gear 22 is coupled to output axle gear 23. Output axle gear 23 is fixedly coupled to an output axle 24 by conventional means (such as a key or a pin). The rotational energy of output shaft 12 is thus transferred to output axle 24 by transmission gear 22 and output axle gear 23.

An input terminal brake gear 25 is fixedly attached to shaft 2 at the input of rotary drive mechanism 4 by conventional means (such as a key). Input terminal brake gear 25 is engaged with an input terminal brake gear 26. Input terminal brake gear 26 is fixedly attached to an output terminal brake axle 27 (by a conventional method such as a key or a pin). An electromagnetic braking device 28 is coupled to output terminal brake axle 27 by conventional means (such as a key or a pin). Electromagnetic braking device 28 will generate braking torque when it is energized. As with electromagnetic braking device 21, electromagnetic braking device 28 may be replaced with a mechanical brake, which may be actuated manually or hydraulically, depending upon user requirements.

An auxiliary generator 29 (suitably a D.C. generator, or an A.C. generator the output of which is rectified by a rectifier) is provided. Generator 29 may be driven through a belt (or some other conventional coupling method) by internal combustion engine 1. Generator 29 is used to generate power.

A voltage regulator 30 is connected to the electrical output of generator 29, and is used for controlling the generator under variable engine speed conditions to provide a stable voltage output to charge a battery. A pair of batteries 31 and 32 are connected in series between voltage regulator 30 and a ground terminal.

A speed sensor 33 is coupled to output terminal brake axle 27. Speed sensor 33 generates a signal (either analog or digital) corresponding to the speed of internal combustion engine 1. Speed sensor 33 may be any conventional speed sensing device (such as a photocell or electromagnetic speed sensor). Speed sensor 33 may be coupled to output terminal brake axle 27 by any method such that the rotational speed of the shaft which it is measuring rotates in direct proportion to the rotational speed of internal combustion engine 1.

A speed sensor 34 is coupled to output axle 12 and generates a signal (either analog or digital) corresponding to the angular velocity of the output axle. Speed sensor 34 may be any conventional shaft speed sensor (such as a photocell or electromagnetic speed sensor). Speed sensor 34 may be coupled to output shaft 12 by any method such that the shaft the speed of which speed sensor 34 measures rotates in direct proportion to the angular velocity of output axle 12.

An electromagnetic accelerator adjustment driver 35 is responsive to the output of speed sensor 34. Accelerator adjustment driver 35 actuates an accelerator to cause internal combustion engine 1 to operate at a predetermined speed.

An electronic controller 36 is used to control the various elements of the multi-driving system. Electronic controller 36 may comprise conventional switches, potentiometers, photocells, solid state and other electronic elements, a microcomputer, etc. Electronic controller 36 comprises a control device 100 and a driving interface element.

Figure 2:
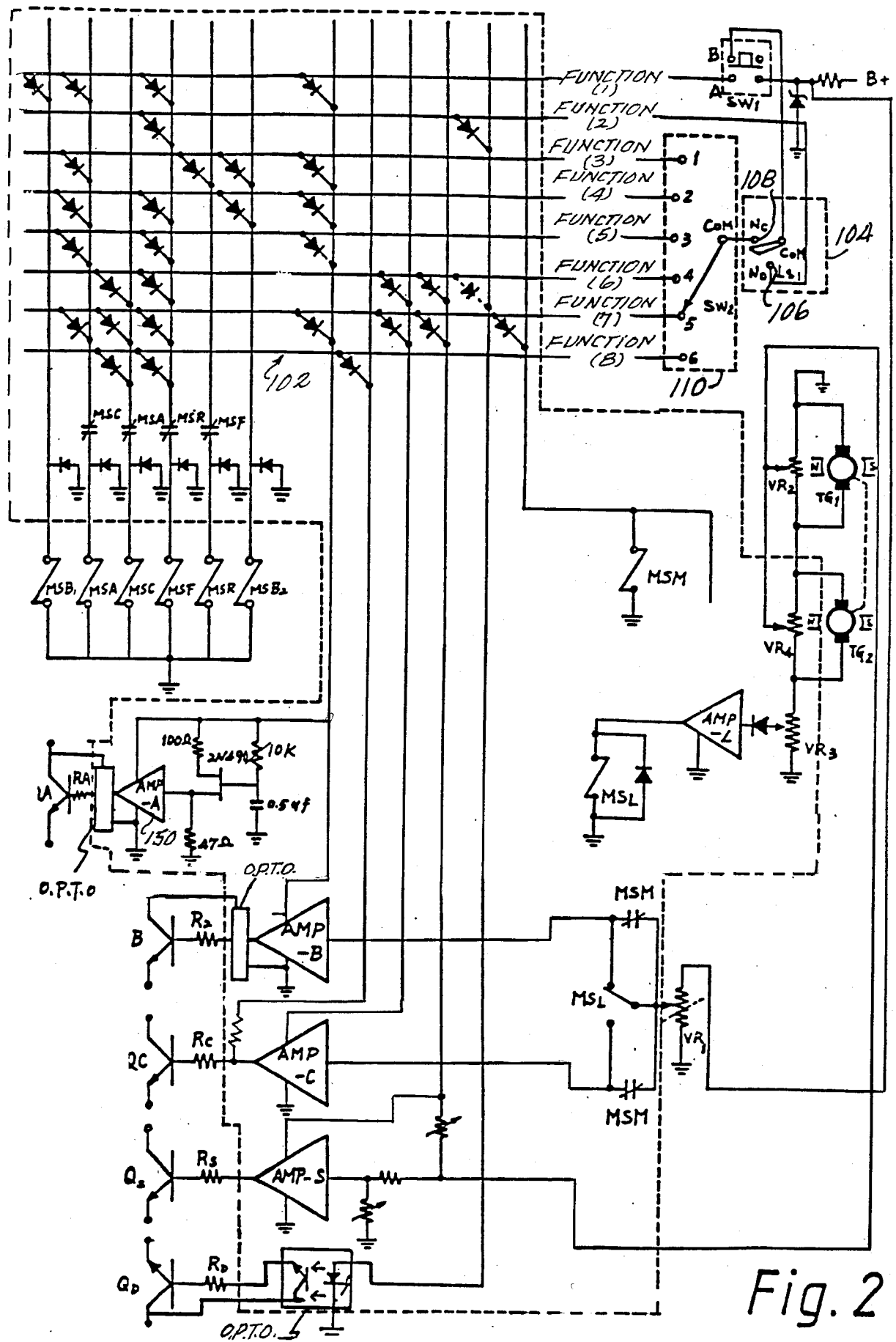
FIG. 2 is a schematic diagram of the control device block of the embodiment shown in FIG. 1.

Referring now to FIGS. 1 and 2, an engine starting switch SW1 is connected to the output of voltage regulator 30. A contact A of engine starting switch SW1 is connected to the input terminal of a program matrix 102, while a contact B of the switch is connected to a common terminal of a brake switch 104. Brake switch 104 is a regenerated power brake switch, and is connected to a brake pedal (not shown). A contact 106 of brake switch 104 is connected to program matrix 102, while another contact 108 is connected to the common terminal of a driver selection switch 110.

Driver selection switch 110 is used to introduce commands to control the function of the multi-driving system. The position of driver selection switch 110 may be positioned to start internal combustion engine 1 and to regenerate power for braking. The rotary drive mechanism 4 may be operated in a forward or a reverse driving mode, or to drive in synchronization with internal combustion engine 1. Internal combustion engine 1 may be run at a constant speed. The rotary drive mechanism 4 may perform the functions of a transmission, a power generator and a coupler simultaneously. Rotary drive mechanism 4 may be operated in a coupling mode, and may then operate the accelerator (not shown) to control the internal combustion engine 1 for transmission of the engine output.

An output/input adjusting resistor VR1 may operate synchronously with the accelerator (not shown).

Electronic controller 36 includes a program matrix 102, and switching and amplification elements (which may comprise electric, electronic or microcomputer devices) to process the output of the program matrix. Electronic controller 36 takes as inputs the output of speed sensors 33 and 34. Electronic controller 36 generates a number of switching outputs by controlling field polarity switches MSF and MSR, in armature drive switch transistor QA, a wave-clipping switch SCRA, a potential preset transistor QB, a switch MSA, a generator coupling operation switch MSC, a wave-clipping control transistor QC, a regenerated power brake control transistor QD, a control transistor QS (for controlling accelerator adjustment driver 35 to maintain constant speed of internal combustion engine 1), and brake device switches MSB1 and MSB2 (which actuate electromagnetic brakes 21 and 28, respectively).

The positive terminal of the power supply (the output terminal of voltage regulator 30) is connected to a thyristor (SCR) 111. The anode of SCR 111 is connected to the collector of an NPN power transistor QA, while the cathode of SCR 111 is connected to the emitter of transistor QA. The base of transistor QA is driven by a pulse signal of a selected frequency, which drives the transistor into saturation and cutoff. The anode of a diode 112 is connected to the anode of SCR 111, while the cathode of diode 112 is connected to the collector of an NPN control transistor QB. The emitter of control transistor QB is connected to a bias resistor 116 and to the cathode of a zener diode ZDA. The other terminal of resistor 116 is connected to the cathode of SCR 111, while the anode of zener diode ZDA is connected to the gate of the SCR. Zener diode ZDA selects an operating voltage.

Parallel-connected power transistor QA and SCR 111 are connected in series with a current limiting resistor RA and the D.C. armature 11 (through slip rings 14 and 15). Slip rings 14 and 15 may, if necessary, be shunted by a capacitor CA.

When power is supplied by voltage regulator 30, and a predetermined driving signal is delivered to the base of power transistor QA from control device 100 (through series resistor RA), SCR 111 will be triggered if:

$$[(V_{AK} \cdot R_{116})/(R_{116}+R_{QB})] > V_{ZDA} + V_G$$

(where $V_{AK}$ is the voltage across SCR 111, $R_{116}$ is the resistance of bias resistor 116, $R_{QB}$ is the internal resistance of control transistor QB, $V_{ZDA}$ is the zener voltage of zener diode ZDA, and $V_G$ is the triggering voltage of SCR 111). When SCR 111 is triggered, armature 11 and capacitor CA will be energized through current limiting resistor RA. When power transistor QA becomes conductive, SCR 111 will turn off, and a voltage $V_{CA}$ will remain across capacitor CA.

SCR 111 will become conductive again when $$[(V_{AK} \cdot R_{116})/(R_{116}+R_{QB})] > V_{ZDA} + V_G + V_{CA}$$

(where $V_{CA}$ is the voltage across capacitor CA, as mentioned above).

SCR 111 will be temporarily cut off when $$[(V_{AK} \cdot R_{116})/(R_{116}+R_{QB})] > V_{ZDA} + V_G + V_{CA}$$

At this time, capacitor CA will continuously supply current to the load; VCA will decrease until SCR 111 triggers and conducts once again.

The voltage across control transistor QB will be variable.

Control transistor QB and bias resistor R116 may be replaced with a three-terminal variable resistor. Additionally, capacitor CA may be replaced with a counter-E.M.F. reference voltage. Current limiting resistor RA may be connected to the cathode of SCR 111 and to bias resistor R116.

A capacitor may be connected in parallel to resistor RA to provide a reverse bias to the bias provided by control device 100. When the next conductive cycle occurs, the reverse bias provided by such a parallel capacitor will delay the time at which power transistor QA conducts and thus limit the current, to provide over-current protection.

The regenerated power braking function may be provided when the armature voltage produced by armature 11 of rotary drive mechanism 4 is higher than the voltage produced by batteries 31 and 32. In this case, a switching transistor QD (which is connected in series with a diode DD to provide reverse voltage protection) conducts. Voltage is applied to perform a regenerated feedback braking function. A DC to DC converter charges batteries 31 and 32 with stepped-up voltage.

For the multi-driving system to function as a coupling drive transmission, armature control and magnetic field control must be provided.

To control armature 11, a constant exciting field with an electromechanically or solid state element is connected in parallel to the output terminal of the armature for generating circulating current to produce coupling torque. Control between the circulating current value, the coupling torque and the coupling speed may be obtained by means of a resistor connected in series with a solid state switching element operating in a clipper mode. An alternative method of magnetic field control is to short-circuit the output terminal of a switching element, and to control the coupling torque by means of the magnitude of the excitation field in order to change the coupling speed.

When the rotary drive mechanism 4 is used for driving, power regeneration, or generating power coupling, it may, depending upon the output characteristics required, use series excitation, shunt excitation or compound excitation connections. Alternatively, a series excitation and driving connection (accomplished by means of control elements that are connected in series with the shunt excitation field and the armature 11) may be used to increase the excitation force to obtain approximate series excitation running characteristics when the armature load current is increased.

The control of the multi-driving system to control it to perform in its various modes will now be described.

To start internal combustion engine 1, engine starting switch SW1 (suitably a push-button switch) is turned on. Program matrix 102 will produce an output to actuate brake 21 (which is indirectly coupled to output axle 24). Magnetic field switch MSF and armature switch MSA will be closed, and a control amplifier 150 (a part of the armature drive control circuit) will be energized. If output/input regulating resistor VR1 (connected to the accelerator) is at an appropriate resistance value (for instance, because the acclerator is being stepped on), the armature drive control circuit will provide a current input to armature 11 to generate rotational energy to start internal combustion engine 1.

Once the system is running, if the brake (not shown) is stepped on, a brake switch 104 will close, causing the common power supply to be connected to drive selective switch 110 and program matrix 102 to maintain the excitation current of rotary drive mechanism 4 at a maximum value. When a feedback transistor QD is turned on, the high speed inertia dynamic force of rotary drive mechanism 4 will be converted into electric energy to charge batteries 31 and 32.

To cause rotary drive mechanism 4 to operate in a reverse driving mode, the position of drive selective switch 110 is selected so that program matrix 102 produces an output to actuate electromagnetic brake 28. When reverse exciting electromagnetic switch MSR is turned on, an excitation field is created. When armature driving electromagnetic switch MSA is turned on, rotary drive mechanism 4 will deliver a reverse output.

In addition to changing the driving direction of rotary drive mechanism 4 by means of a gear assembly, the driving direction may also be changed by applying armature current to armature 11 in a reverse direction upon using rotary drive mechanism 4 in a driving mode. Speed control may be performed by means of a wave-clipping circuit connected in series to the input terminal of armature 11 and receiving a control signal from variable resistor VR1 (which is connected to the accelerator).

To cause rotary drive mechanism 4 to operate in a forward driving mode, drive selective switch 110 is set at a position which causes program matrix 102 to produce an output to energize electromagnetic brake 28. Simultaneously, forward exciting switch MSF is turned on, causing an excitation field to be produced. Armature driving switch MSA is turned on as well. The wave-clipping circuit connected in series to the input terminal of armature 11 is controlled by variable resistor VR1 (connected to the accelerator ). A corresponding drive output is produced.

To simultaneously drive output shaft 24 with the output of internal combustion engine 1 and rotary drive mechanism 4, the position of driver selective switch 110 is set to an appropriate position to control program matrix 102. Forward exciting eledtromagnetic switch MSF is turned on, causing excitation windings 5 to produce an electromagnetic field. Additionally, armature drive electromagnetic switch MSF is turned on, and the wave-clipping control circuit connected in series with the input of armature 11 is controlled by variable resistor VR1. When the accelerator is stepped on, the resistance of variable resistor VR1 is changed, causing internal combustion engine 1 and rotary drive mechanism 4 to simultaneously drive output shaft 24.

To maintain internal combustion engine 1 at constant rotational speed while operating rotary drive mechanism 4 in a transmission mode, the feedback signal produced by speed sensor 33 (indicative of the angular velocity of output axle 26 of the engine) is applied to a drive comparison circuit for driving an electromagnetic attractive accelerator regulator for timely regulation of the accelerator to maintain constant engine running speed. Constant speed may also be maintained by using a conventional centrifugal constant speed accelerator regulator (or any other constant speed maintaining means).

When internal combustion engine 1 is running at a constant speed, its output will increase the excitation force of the magnetic field produced by excitation windings 5 of rotary drive mechanism 4. The output current produced by armature 11 will (through the wave-clipping switch connected in parallel to its output terminal) vary so as to change the coupling torque for regulating the rotational output. The output torque may also be changed by short-circuiting both ends of armature 11 in order to vary the field strength. Alternatively, any conventional wave-clipping may be employed.

Speed sensor 28 (producing an output indicative of the R.P.M. of internal combustion engine 1) and the signal of speed sensor 34 (indicative of the angular velocity of output axle 34) may be connected in reverse series. When coupling low rotational speeds, a signal is generated which causes the voltage applied to variable resistor VR1 to switch from the generated power coupling circuit to the supplied power driving wave-clipping control circuit to cause the rotary drive mechanism 4 to increase the speed of output axle 24. The signal applied to variable resistor VR1 is changed from the generated power coupling circuit to the supply power driving circuit because the maximum angular velocity that internal combustion engine 1 is designed for is lower than the maximum angular velocity which rotary drive mechanism 4 is capable of producing. In other words, at the point at which this change occurs, the generated voltage of rotary drive mechanism 4 is lower than the voltage of batteries 31 and 32 because of a reduced field current supplied to excitation windings 5. The generated voltage has a reverse polarity with respect to the driving input voltage to batteries 31 and 32.

When rotary drive mechanism 4 is used in a transmission coupling mode as a clutch, the excitation windings 5 of rotary drive mechanism 4 are supplied with current such that they produce a maximum excitation magnetic field. Thus, armature 11 performs maximum generated power coupling. A transmitted driving output may be obtained by using a conventional accelerator regulating method to control the speed of internal combustion engine 1.

Figure 5:
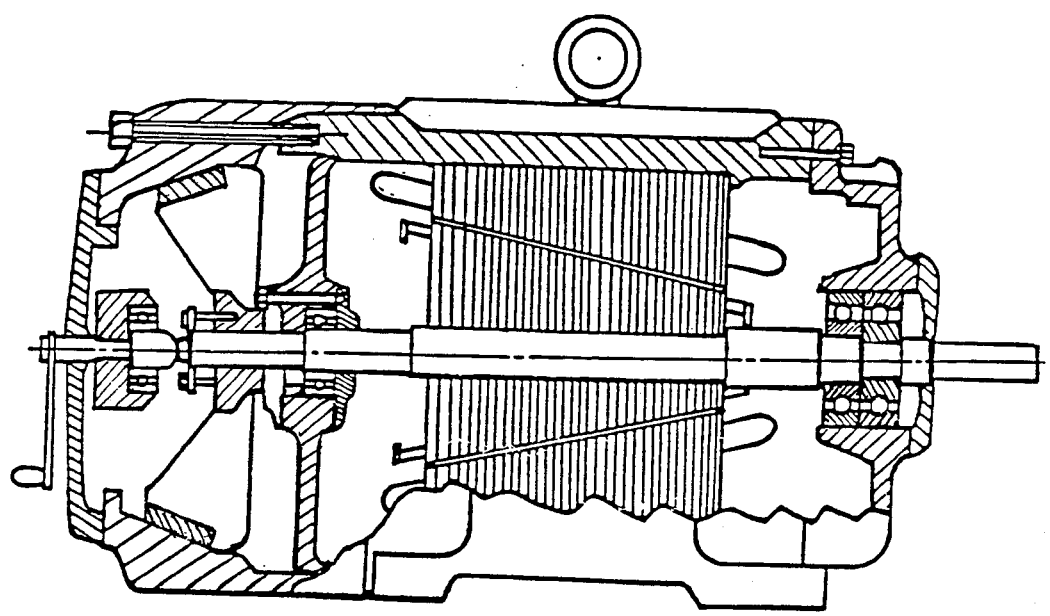
FIG. 5 is a side elevational view in section of a conventional conic rotor electromagnetic brake motor.

To increase coupling efficiency, a clutch (driven conventionally by mechanical, pneumatic, hydraulic or electromagnetic actuating means) may be installed between the rotation driving field and the rotation driving stator to operate as a mechanical friction-coupling transmission device. Alternatively, armature 11 and excitation windings 5 of rotary drive mechanism 4 may be configured as a conventional conic rotor electromagnetic brake motor (as shown in FIG. 5). In this configuration, when windings 5 are supplied with current, the conic rotor will move axially to release the brake. When the excitation current is removed, a spring will actuate the brake.

If armature 11 of rotary drive mechanism 4 and associated slip rings 16 and 17 and rotary armature commutator 10 have the same number of poles as that of the magnetic excitation field, the magnetic excitation field can be produced by a permanent magnet or a direct current electromagnetic field. In such a case, the rotor may be driven by an electro-mechanical or solid state switching assembly which continuously varies the polarity of the current supplied so as to provide the rotor winding with an alternating current having an adjustable frequency. Coupling may be performed by applying a D.C. excitation current to the rotor to permit the field and the rotor to synchronously attract one another (for synchronous coupling), or by adding a variable resistor to change the degree of coupling (thus operating similar to a A.C. winding rotor induction device that is controlled with an external series resistor). If there are a different number of field poles in rotary drive mechanism 4 than there are rotor poles, but if the poles are appropriately distributed, a step drive and coupling function may be obtained. In such a case, the speed control method is the same as that discussed above. In comparing the various armature control arrangements for the different modes of operation of rotary drive mechanism 4 discussed above, the only difference is that a vibrator (or an analog volume adjustment control circuit) is used instead of the D.C. carrier wave; operation and control will, however, remain the same.

Rotary drive mechanism 4 may, if necessary, be modified by constructing it to have inner rotating magnetic field windings and an outer armature. If the multi-driving system is required to perform only a subset of the modes discussed above (such as only the coupling transmission mode), electronic controller 36 need only include the control elements necessary for that mode, and electromagnetic brakes 21 and 28 may be omitted. If necessary, the quantity of internal combustion engines 1 or rotary drive mechanisms 4 may be selected in order to form a multi-driving system through the rotation means.

Figure 3:
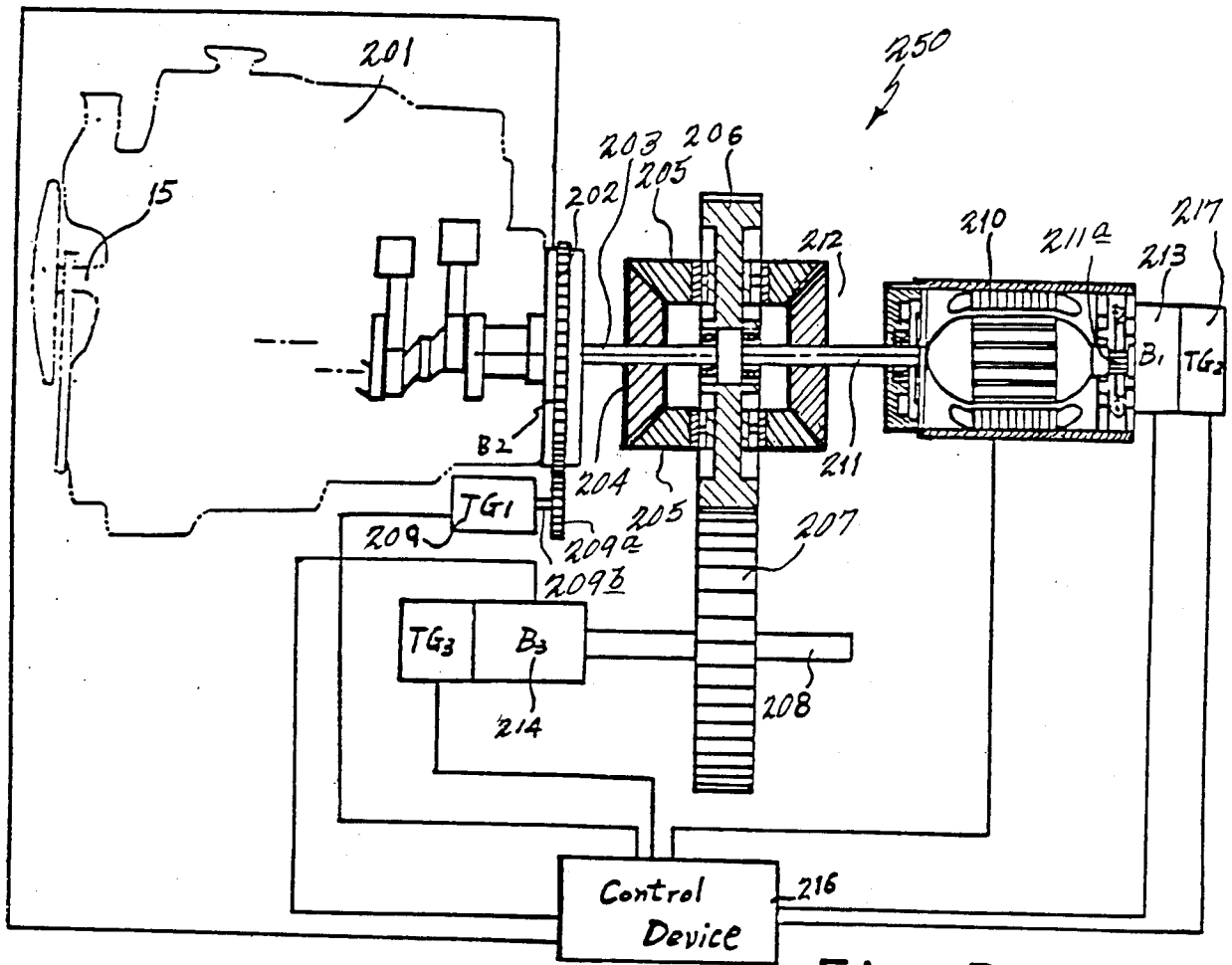
FIG. 3 is a schematic representation of a second presently preferred embodiment of a multi-driving system in accordance with the present invention.

Referring to FIG. 3, a second embodiment of a multi-driving system 250 employing a parallel drive feature is shown. An internal combustion engine 201 converts conventional fueld (such as gasoline, diesel oil, alcohol or gas) into mechanical rotational energy. A brake 202 is provided at the rotational output of engine 201. Brake 202 may be any conventional electromagnetic, manual, pneumatic or hydraulic brake unit. Rotational energy produced by internal combustion engine 201 appears at output shaft 203 (output shaft 203 may comprise any device for transmitting rotational energy). A differential gear unit 204 is coupled to output shaft 203. Differential gear unit 204 includes a differential gear 205, an output gear 206, and a second input gear 212 (which is coupled to a second rotatable shaft 211). Output gear 206 is coupled to an output axle gear 207, which is journalled to an output axle 208.

An electrical device 210 is coupled to input shaft 211. Electric device 210 may comprise a motor/genrator unit, which may be used either as a driving motor to provide rotational energy, or as a generator to provide A.C. or D.C. power.

A shaft 211a of electrical device 210 is coupled to a rotor brake 213. Brake 213 may be actuated electromagnetically, manually, pneumatically or hydraulically. Shaft 211a is also coupled to a speed sensor 217.

A speed sensor 209 (of conventional design, for example an electromagnetic or photocell speed sensor) is coupled to brake 202 (on the output shaft 203 of internal combustion engine 201) through a gear 209a and a shaft 209b.

A brake unit 214 (which may be actuated electromagnetically, manually, pneumatically or hydraulically) is coupled to an output axle 208. A speed sensor 215 is used to monitor the angular velocity of output axle 208.

A conventional centrifugal constant speed controller 215 is used for controlling the accelerator (not shown) on internal combustion engine 1.

Figure 4:
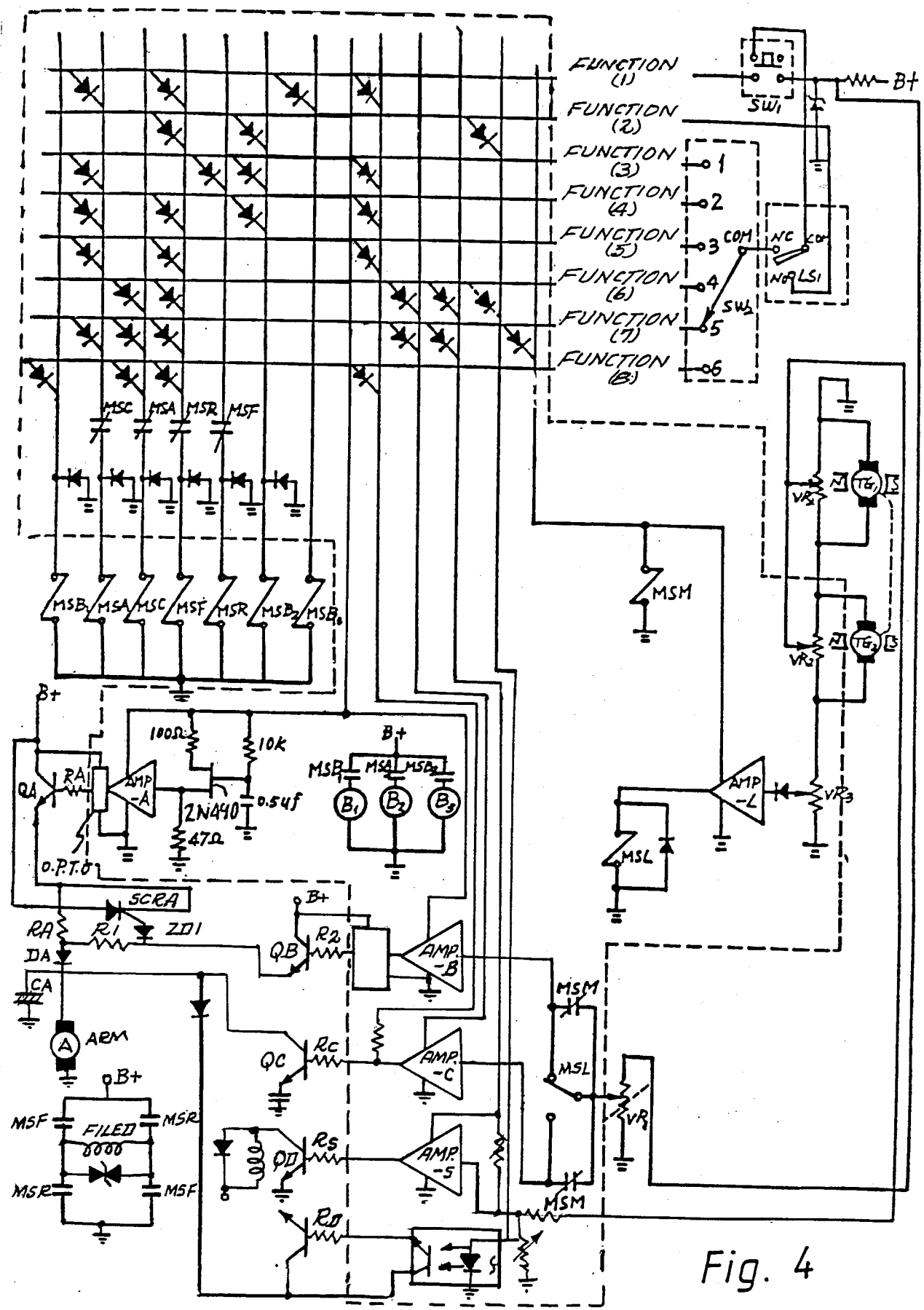
FIG. 4 is a schematic diagram of the control device block of FIG. 3.

A controller 216 controls system 250. Controller 216 may comprise conventional switches, potentiometers, photocells, solid state or mechanical electrical elements, or a microcomputer. Controller 216 includes two main sections; a control section and a driving interface section. Referring to FIGS. 3 and 4, the multi-driving system 250 may be operated in a number of modes. For instance, the system may be used to start internal combustion engine 201, to produce electrical power to charge a battery, to convert electrical power from a battery into rotational energy, to simultaneously drive output shaft 208 by both the output of internal combustion engine 201 and electric device 210 (acting as an electric motor), or for using internal combustion engine 201 for conventional driving.

To start internal combustion engine 201, brake 214 is locked, and electric device 210 is operated as a motor to supply power to start the engine.

To produce electric current, internal combustion engine 201 is stopped. Because of the mechanical damping of internal combustion engine 1 or alternatively, because of the effect of brake 202 (if actuated), the inertia force of output axle 208 will, through gears 207, 206 and 212, cause shaft 211 to turn. Electric device 210 is operated in a generator mode to produce power to be used, for instance, to charge a battery (not shown).

To use multi-driving system 250 to convert electrical energy into mechanical energy, a driving current is applied to electric device 210 to cause it to act as a motor. The mechanical output which electric device 210 produces at output shaft 211 causes gears 212 and 206 to rotate. The rotational energy is transferred by gear 207 to output shaft 208. Brake 202 is actuated to prevent internal combustion engine 201 from rotating (or alternatively, the mechanical damping of the engine is relied upon).

To drive output shaft 208 simultaneously by internal combustion engine 201 and electric device 210, internal combustion engine 201 is operated under the control of a manual accelerator with a speed-setting variable resistor. At the same time, electric device 210 is operated as a motor to deliver added output to the system.

Internal combustion engine 201 may be operated at a constant speed under the control of centrifugal constant speed control device 215, which is coupled to the accelerator (not shown). Because of the damping effect caused by the output of electric device 210, a variable output speed may be obtained. The input terminals of the armature of electric device 210 may be short-circuited (or connected in series with a fixed resistor) to vary the excitation current and therefore the armature voltage. In this way, damping of the rotational energy produced by the system is accomplished. Alternatively, a constant excitation current may be applied to electric device 210, but resistance connected in series with the armature of the electric device may be varied. Yet another method of varying the mechanical output of electric device 210 is to connect its armature in series with a solid state or electromagnetic switch having a clip-wave output, or by varying the field strength to change to charging current produced by the armature to the battery, or by changing the current delivered to another load to generate damping for producing output torque at the output axle 208.

Speed sensor 218 (coupled to output axle 208) may be used to change the coupling damping effect through a feedback loop.

A mode in which output shaft 208 is driven by both internal combustion engine 201 (rotating at constant speed) and the mechanical output produced by electric device 210 (operating as a motor) is accomplished by operating the system as described above to produce maximum generated power damping. Electric device 210 is supplied input power to supply rotational energy to output shaft 208 to continually increase the angular velocity of output axle 208.

Internal combustion engine 201 may also be used for conventional driving. Brake 213 is actuated to lock shaft 211a, thus producing a clutch function.

Electric device 210 may be furnished with a conic electromagnetic rotor in order to obtain the same function as that of brake 213.

Figure 6:
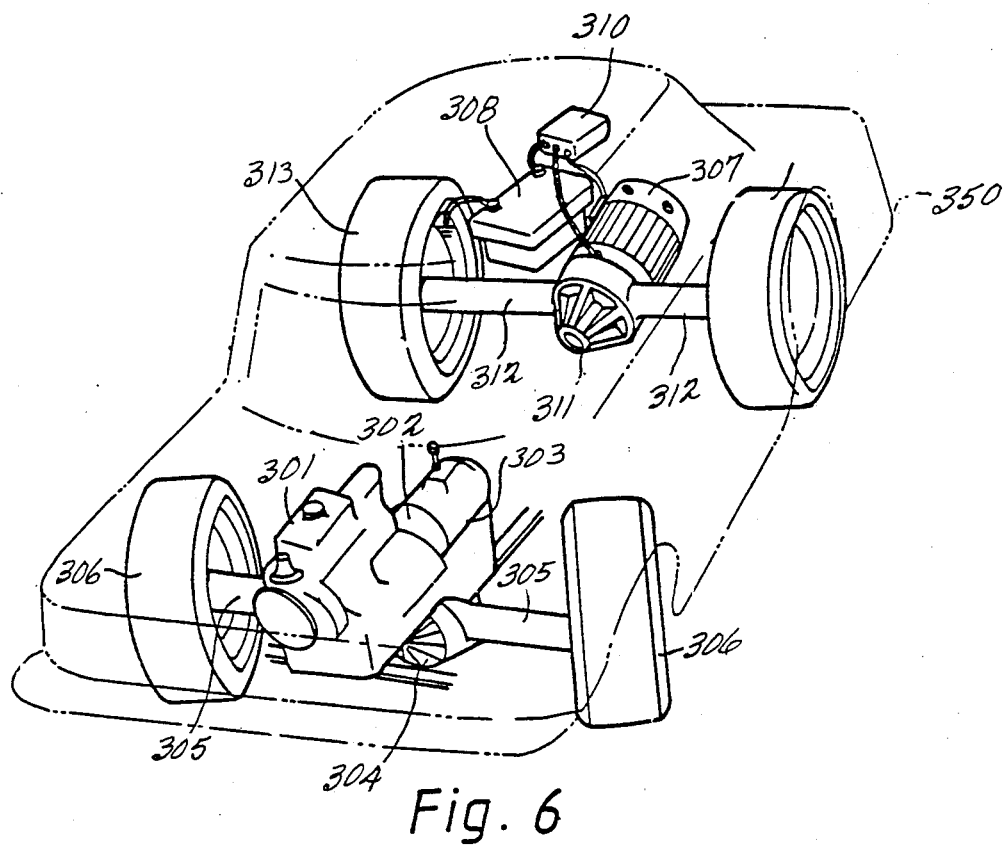
FIG. 6 is an elevated perspective view of another embodiment of a multi-driving system installed in a vehicle wherein the front and rear wheels of the vehicle may be driven independently.

Referring to FIG. 6, shown in an embodiment of a motor vehicle 350 having a pair of front wheels 306 driven by an internal combustion engine 301 and a pair of rear wheels 313 driven by a driving motor 307. Internal combustion engine 301 and driving motor 307 are independent units which can be driven singularly or coupled together. Internal combustion engine 301 may be started, a regenerated power brake function may be performed, or a battery 308 may be charged by using drive motor 307 as a generator while internal combustion engine 301 is driven.

Internal combustion engine 301 is coupled to a transmission and driving gear box 303 through a clutch 302. Front wheel 306 are driven through a front wheel transmission axle 305, which is coupled to differential gear system 304. Driving motor 307 (which may be a conventional D.C. motor or a conventional A.C. motor driven with a vibrator) is coupled to a rear wheel drive differential gear box 311, which in turn is coupled to rear wheel transmission axle 312. Rear wheel transmission axle 312 drives rear wheels 313. Driving motor 307 is equiped with a clutch (not shown). A motor driving switch 310 (comprising an analog or clip-wave type speed and charge control device) is electrically coupled to driving motor 307 and to battery 308.

There may be more than one driving motor 307, which may be used for jointly or separately driving the wheels. Driving motors may be installed either at the front or rear position of the vehicle with respect to internal combustion engine 301. Moreover, internal combustion engine 301 may be used to drive the rear wheels 313, while the driving motor 307 may be used for driving front wheels 306.

The embodiment shown is simple in construction. Electric motor drive can be used to drive the vehicle in the city at low speeds where electric power consumption is low. The vehicle can also generate power by itself for the braking function, and battery 308 can be charged while internal combustion engine 301 is running. Both front wheels 306 and rear wheels 313 can be driven jointly.

Figure 7:
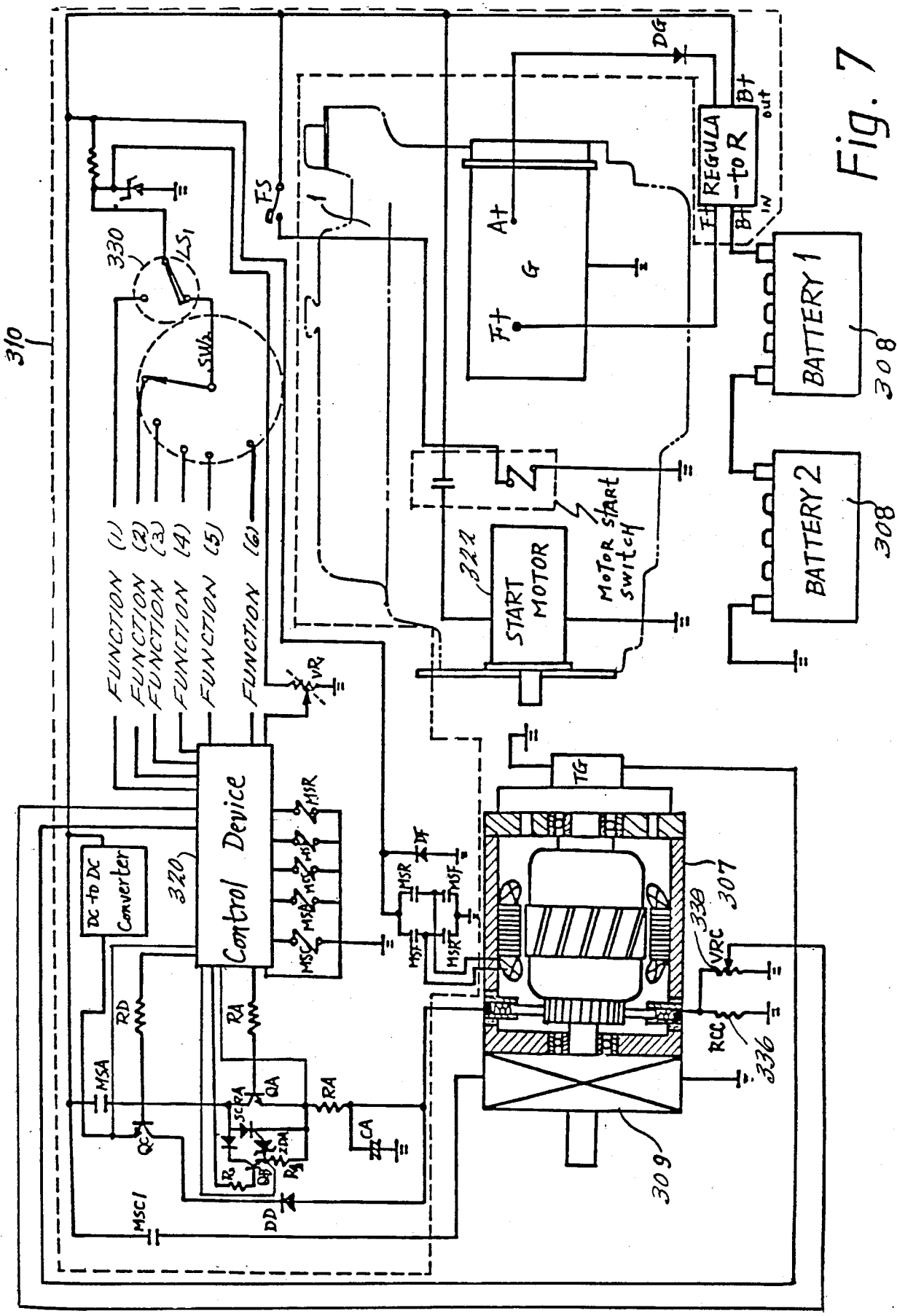
FIG. 7 is a schematic diagram of the embodiment of a multi-driving system shown in FIG. 6.
Figure 8:
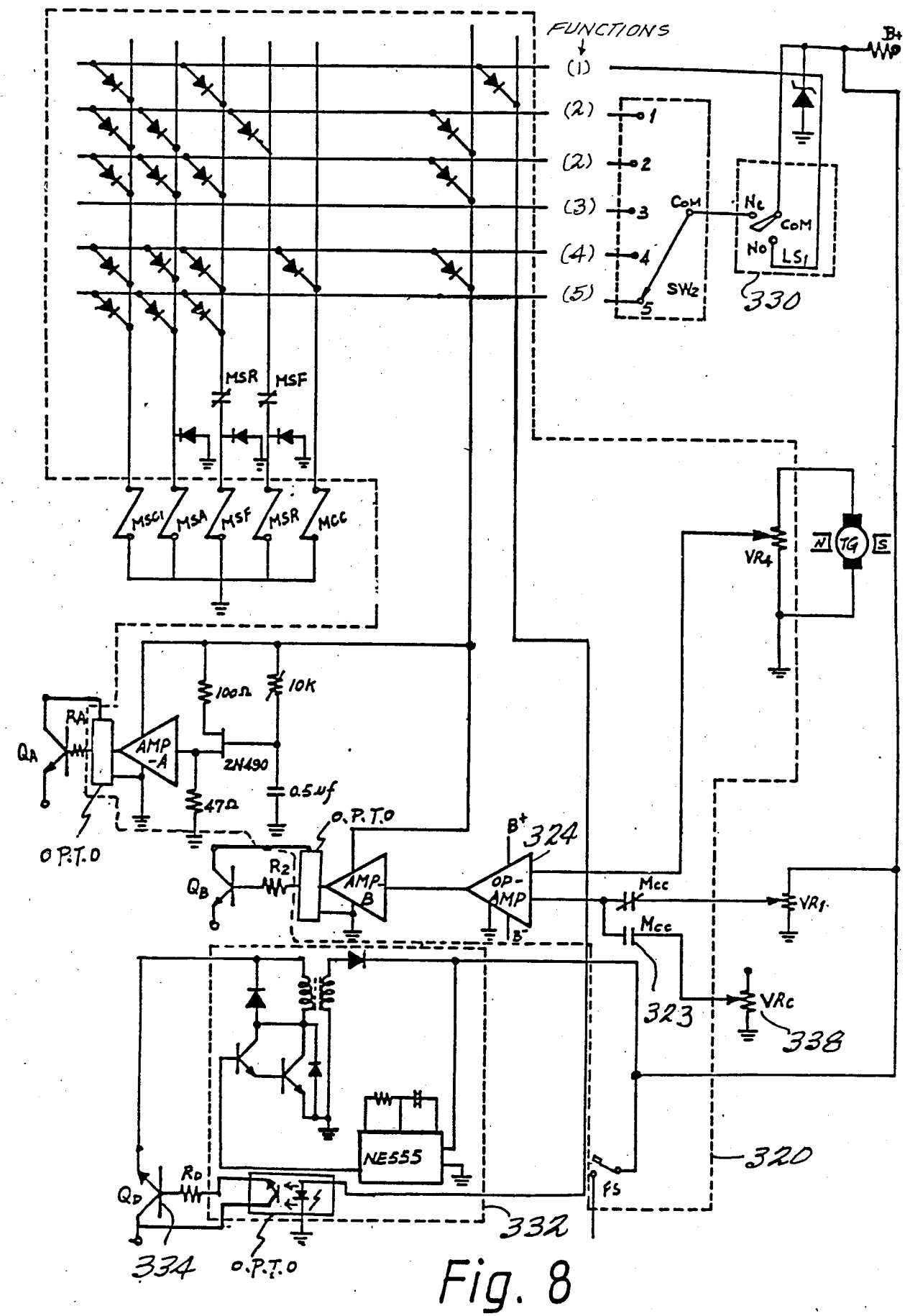
FIG. 8 is a schematic diagram of the control device block shown in FIG. 7.

Motor driving switch 310 may comprise a clip-wave type speed control in which control is accomplished by using multivoltage series impedances. Alternatively, solid state switching elements may be used. Motor driving switch 310 may be used to control driving motor 307 in a variety of different modes, including driving, transmission, forward/reverse rotation, and regenerated power feedback functions. Referring to FIGS. 6, 7 and 8, to operate in a generated power brake mode, switch 330 cuts off the power supply of LS2 and connects to a generated power brake input terminal of a control device 332 to operate an electromagnetic clutch and feedback switch transistor 334, which is coupled between the driving motor 7 and the wheel transmission system 311. Simultaneously, the inertia of vehicle 350 will cause driving motor 307 to generate power, which may, either directly or through a step-up D.C. converter, be fed back to battery 308.

The method of operating in a driving mode with driving motor 307 rotating forward or in reverse is accomplished in the same way as was described previously in connection with FIGS. 1 and 2.

Internal combustion engine 301 may be started by means of driving motor 307. Alternatively, a separate engine starting motor 322 may be actuated with the inertia force of vehicle 350 to start internal combustion engine 301.

The system shown may also be operated to jointly drive vehicle 350 with internal combustion engine 301 and driving motor 307 (which is operated at a predetermined current and torque). When internal combustion engine 301 is conventionally operated and driven, driving motor 307 is also driven and controlled with a predetermined current. Control of driving motor 307 by a predetermined current is accomplished by using a current comparison resistor 336 to yield "IR" (a voltage drop corresponding to the current. A variable resistor 338 is connected in parallel with resistor 336 to set a feedback potential which is connected through a selected relay 323 and is delivered to the input terminal of a differential preamplifier 324 of control device 320 in order to generate a predetermined torque current value for jointly driving with internal combustion engine 301.

Simultaneous driving by internal combustion engine 301 and driving motor 307 is accomplished by using an accelerator control and a motor speed predetermined variable resistor to cause the engine and the driving motor to be driven correspondingly.

During forward or reverse driving, driving motor 307 may be operated in an instant reverse driving mode, which improves braking by shortening the braking distance (also achieving better braking effects on slippery road surfaces).

MULTI-INNER TUBE TIRES

Figures 9, 10:
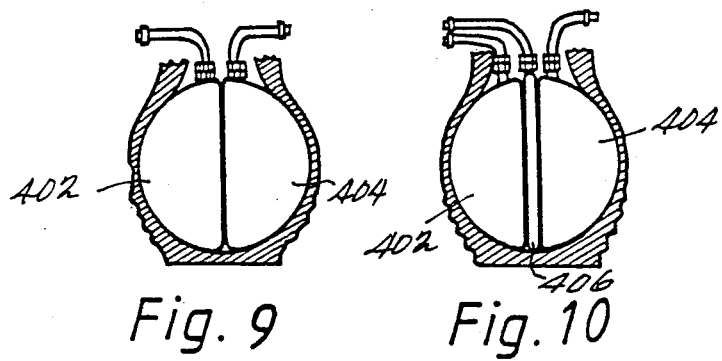
FIG. 9 is a sectional illustration of a tire wherein two inner tubes may be inflated independently.
FIG. 10 is a sectional view of a tire in accordance with the present invention wherein three inner tubes, one of which is a spare, may be inflated independently.

Referring to FIGS. 9 and 10, two embodiments of a multi-inner tube structure for the driving wheel tires of vehicle 350 shown in FIG. 6 are shown. The advantage of the embodiments shown is that they are more puncture-resistant than ordinary tires, reducing the danger caused when tires puncture (such as the possibility of the vehicle overturning).

Driving wheel tires require high performance and safety. Spoke-type wheels have the advantage of light weight and better performance, and thus have been widely used. However, inner tubes used for such tires are liable to be punctured. In accordance with the present invention, a tire including multiple inner tubes is used to reduce the dangers associated with puncturing.

The embodiment shown in FIG. 9 has two inner tubes 402 and 404, which are inflated with air simultaneously. If one of the two inner tubes is punctured, the other inner tube will remain inflated so as to reduce danger.

The embodiment shown in FIG. 10 includes three inner tubes 402, 404 and 406. Two of the three inner tubes (402 and 404) are inflated with air, while the third inner tube 406 is used as a spare. Alternatively, all three inner tubes 402, 404 and 406 may be inflated simultaneously.

EXTENSION BUMPERS

Conventional cars are usually provided with bumpers on the front and on the rear as a collision interface. The bumper is a well-known device used to protect a car in case of a collision. However; the front nose of a small car is usually flat in shape, so that the bumper is rather close to the driver's seat. Therefore, the protective function of such a bumper is reduced. However, if the bumper is extended a little bit farther, the car will require more space for parking. To solve this problem, the inventor has developed an adjustable extension bumper which may be extended by manual-hydraulic or mechanical force.

Figures 1, 11:
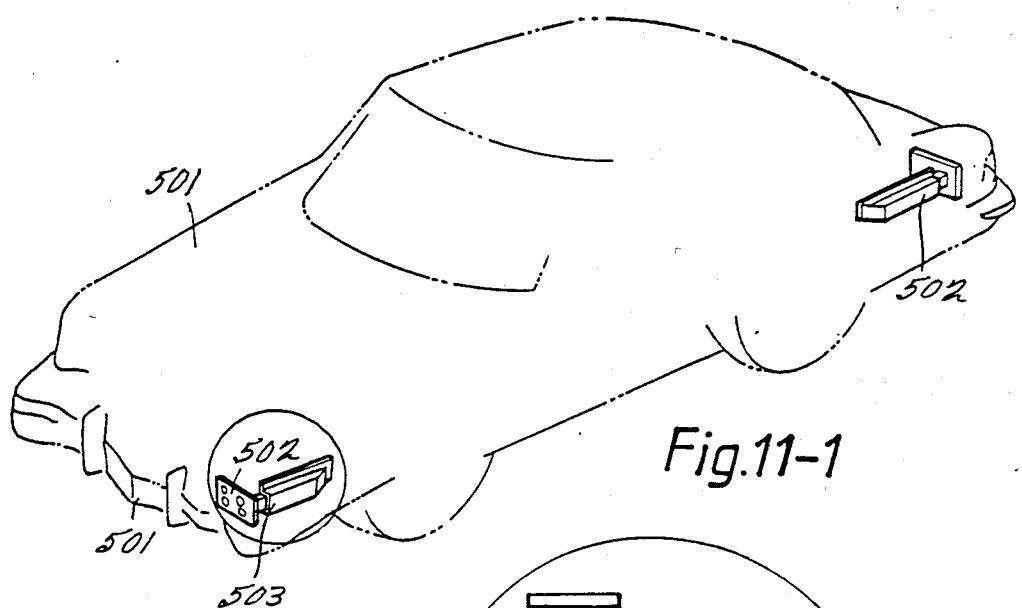
Figures 2, 11:
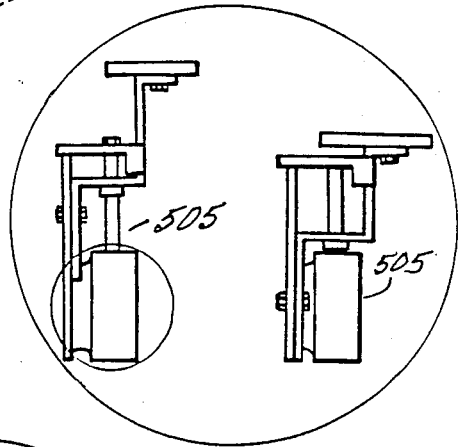
Figures 3, 11:
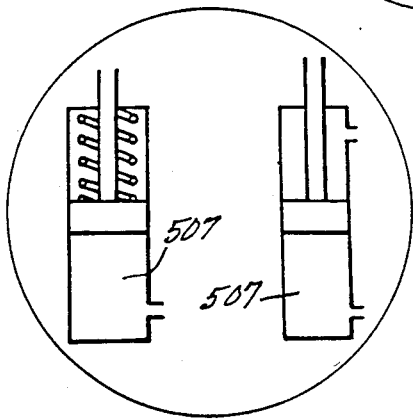

Referring to FIGS. 11-1 to 11-3, shown are embodiments of a bumper is accordance with the present invention. Two embodiments are shown, one of the general type and one of the shock absorbing type. The embodiments shown include a bumper driving device 505, which may include a double-acting device, a pneumatic cylinder 507, a hydraulic cylinder or a conventional mechanical device that can move back and forth. An embodiment including a pneumatic cylinder may be provided with a shock absorbing function.

A sliding rail 503 is used for carrying the bumper 502 so that is may move back and forth. The bumper structure may, if necessary, be installed on the side of vehicle 501 in addition to at the front or the rear of the vehicle.

Figures 1, 12:
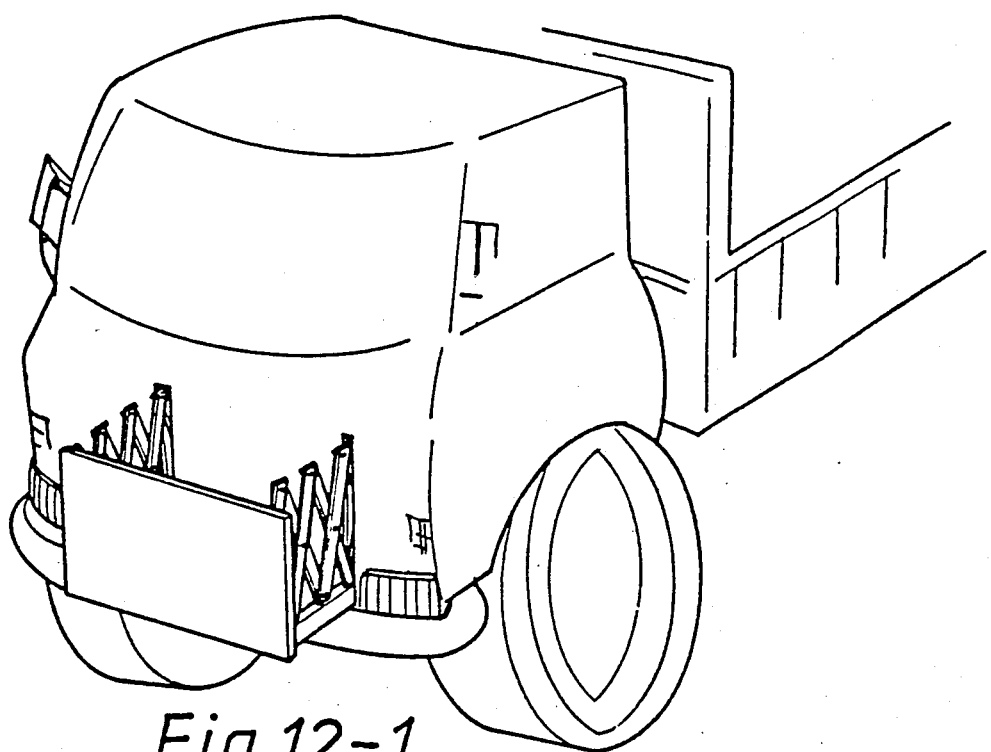
Figures 2, 12:
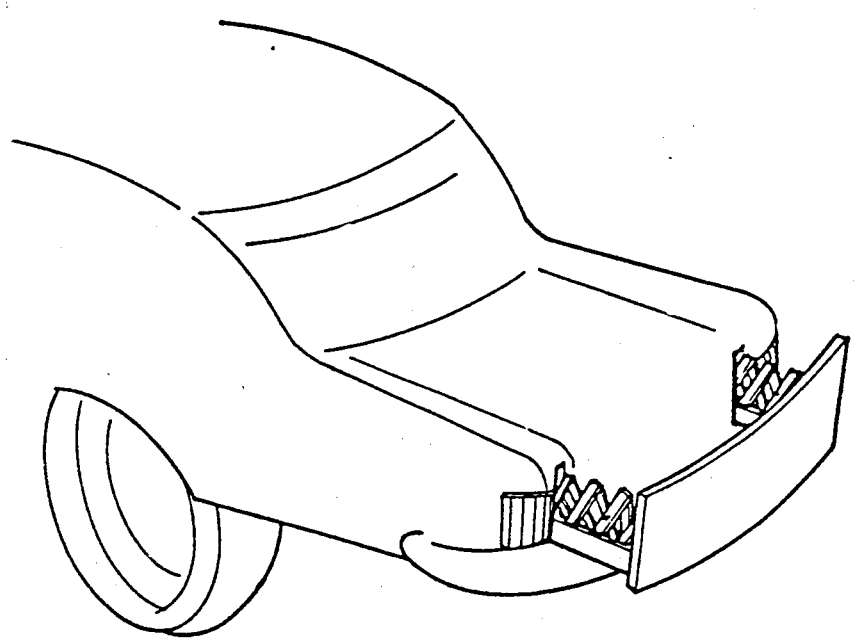

An adjustable extension bumper installed at the front and rear of vehicle 501 may also be used to carry articles by the use of folding elements, a side member, a fixed element, a front plate or a rear plate (as is shown in FIGS. 12-1 to 12-2).

VOLTAGE REGULATOR

Figure 13:
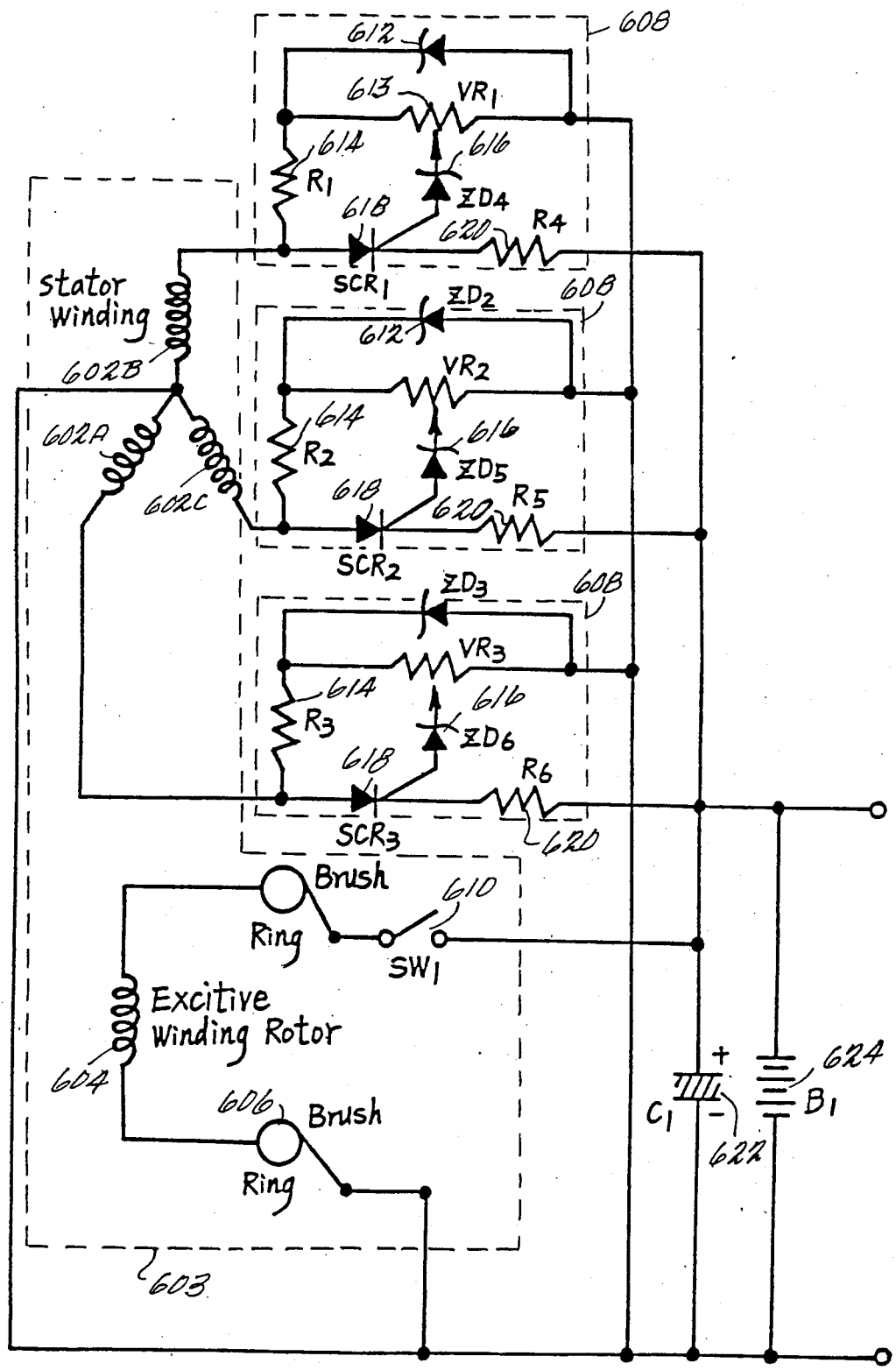
FIG. 13 is a schematic diagram of an embodiment of a differential voltage regulator circuit in accordance with the present invention.

A presently preferred embodiment of the differential voltage type automobile generator voltage regulator circuit is shown in FIG. 13. The field of the automobile generator 603 is constantly and directly excited. At the output terminal of the generator 603, at least one differential voltage sensing circuit 608 with a reference voltage is furnished. The differential voltage sensing circuit 608 will generate a signal when the output voltage of the generator 603 is low to trigger a thyristor 618 (connected in series between the power supply and the load) for regulating the output voltage.

The circuits shown in FIG. 13 comprises single or multi-phase output windings 602a, 602b and 602c and related slip ring, brush and mechanical assemblies (not shown). A thyristor 618 is connected in series with each of the output windings (602a-602c). The thyristor 618 is connected either directly to a load or in series to the load through a charge current limiting resistor 620. If necessary, a capacitor 622 may be connected in parallel with the output to provide the load terminal with a voltage for comparison and for energy storage purposes.

Reference voltage for the differential voltage sensing circuit 608 is provided by a voltage stabilizer circuit connected in parallel between thyristor 618 and the power supply and ground terminals of the A.C. generator winding (602a, 602b, 602c). The voltage stabilizer circuit comprises a resistor 614 and a zener diode 612. Any conventional voltage stabilizing circuit may be used in the alternative.

The reference voltage produced is applied to a variable resistor 613. Voltage from the wiper of variable resistor 613 is applied to thyristor 618 through a diode 616 in order to trigger the thyristor to cause capacitor 622 to charge in order to step up the output voltage when the output voltage falls below the predetermined value range established by the reference voltage. Voltage from the wiper of variable resistor 613 may alternatively be applied directly to thyristor 618. Variable resistor 613 may comprise a resistance-selecting device including several resistors.

When an internal combustion engine (not shown) is started and actuates the generator 603 and a switch 610 is closed, the field winding 604 of the generator will be excited by current from battery 624, thereby causing the stator windings 602A, 602B and 602C to generate an induced voltage. Stator windings 602A-602C may be configured in a three-phased "Y" connection wherein the neutral contact of each windings is a grounded output terminal. The output terminal of each phase is connected in series with a different differential sensing circuit 608, as described above.

Where the voltage from the sliding terminal of variable resistor 613 to ground is VVR1, the voltage drop across diode 616 is VZD4, the trigger voltage of thyristor 618 is VTRIGGER and the voltage across capacitor 622 is VC1, then thyristor 618 will be triggered to become conductive when VVR1>VZD4+VTRIGGER+VC1. When thyristor 618 becomes conductive, the voltage on the load terminal is stepped up. When VVR1<VZD4+VTRIGGER+VC1, the thyristor 618 will be cut off, after passing through a zero value. Therefore, an intermittent conductive state occurs for obtaining a voltage stabilization function.

Figure 14:
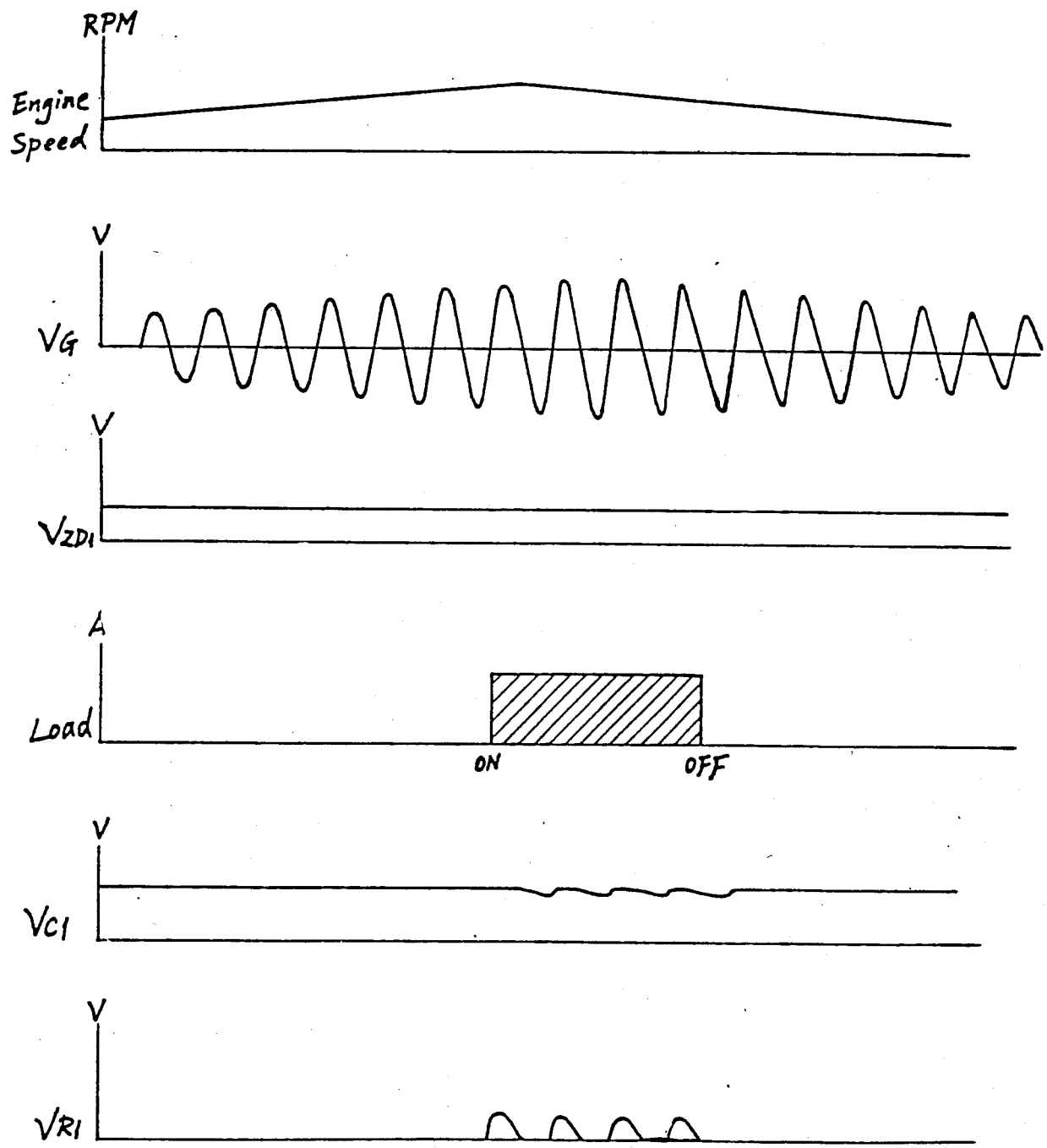
FIG. 14 is a graphical illustration of various signals produced by the voltage regulator circuit shown in FIG. 13.

Wave forms showing the operation of the embodiment of FIG. 13 are shown in FIG. 14.

Figure 15:
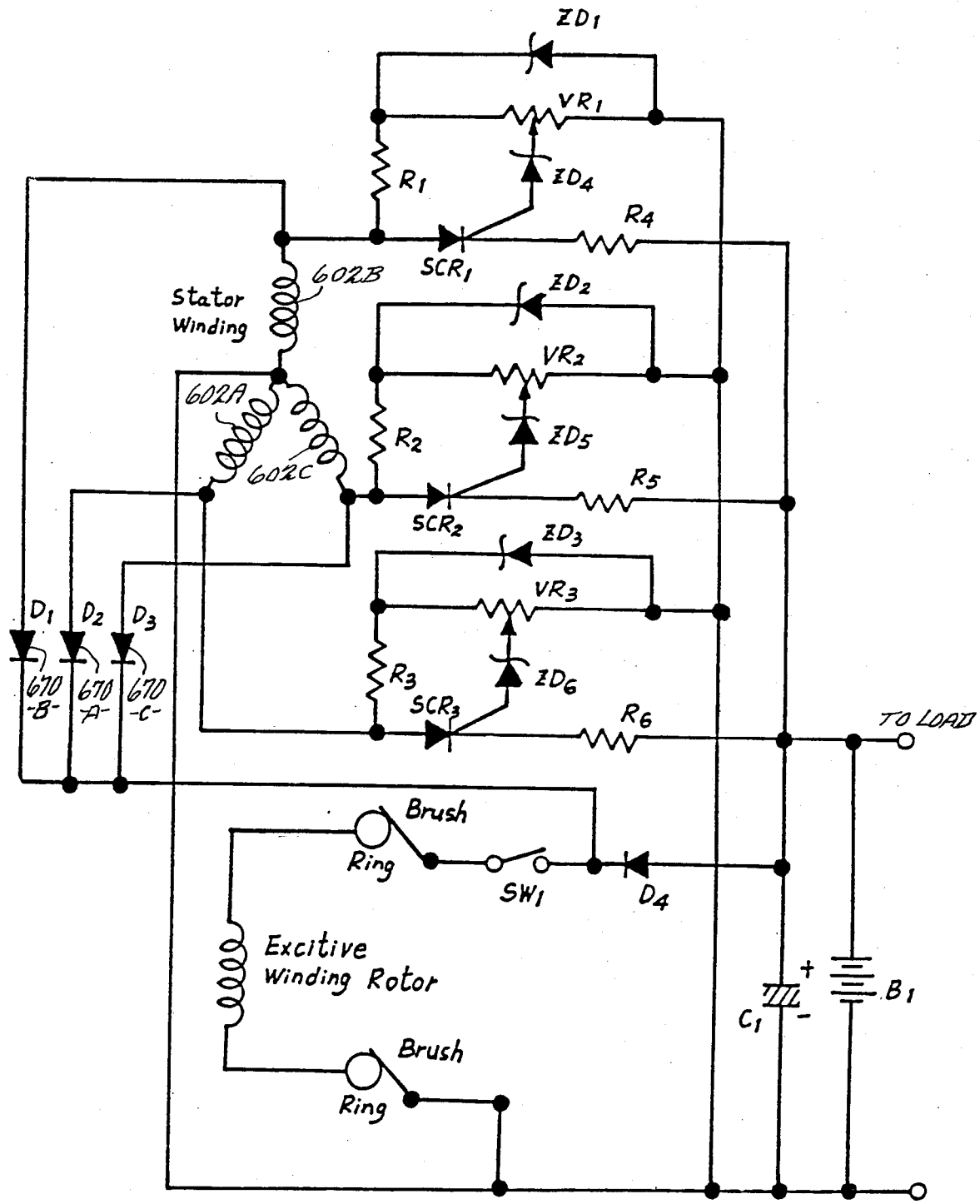
FIG. 15 is a schematic diagram of another embodiment of a voltage regulator circuit in accordance with the present invention.

A second embodiment of the voltage regulating circuit in accordance with the present invention is shown in FIG. 15 in which each of diodes 670A, 670B and 670C are connected in series with each of stator windings 602A, 602B and 602C, respectively. Diodes 670A, 670B and 670C provide self-exciting current. When the engine speed falls, a self-excited field will be established in order to step-up the voltage generated to improve the charge characteristics at low engine speeds.

Figure 16:
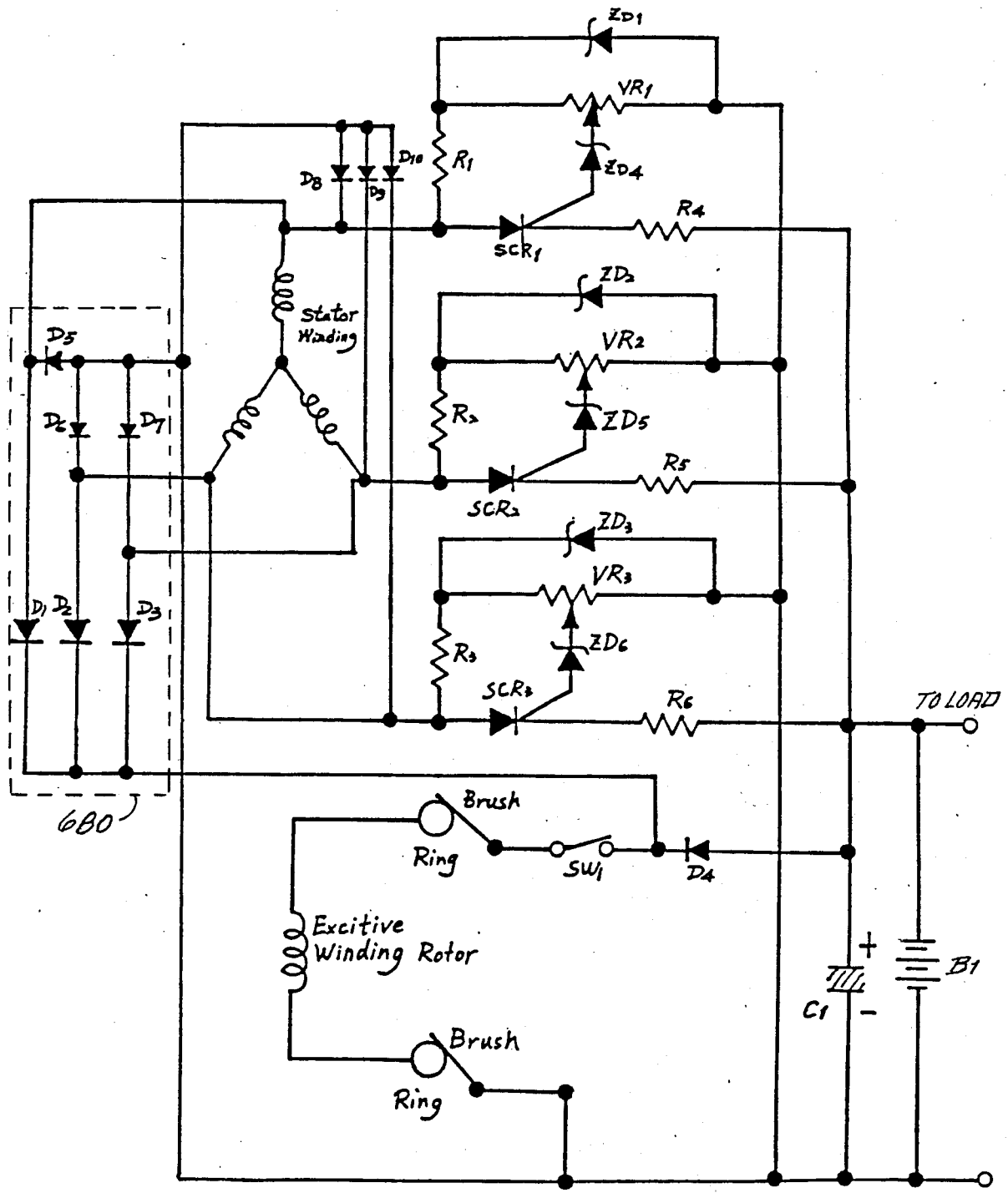
FIG. 16 is a schematic diagram of another embodiment of a voltage regulator circuit in accordance with the present invention.

FIG. 16 shows a third embodiment of a voltage regulator in accordance with the present invention including a diode bridge circuit 680. The ground terminal is connected to the negative terminal of a bridge circuit diode. This embodiment of a voltage regulator has a monitoring and protection function which is important to battery life.

RATIO SCALE METER

Figure 17A:
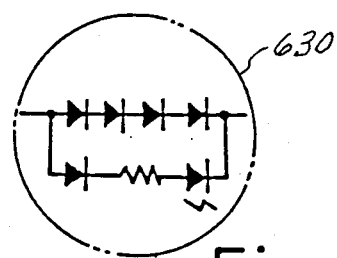
FIG. 17 is a schematic diagramm of a bi-directional difference ratio scale meter in accordance with the present invention.
Figure 17:
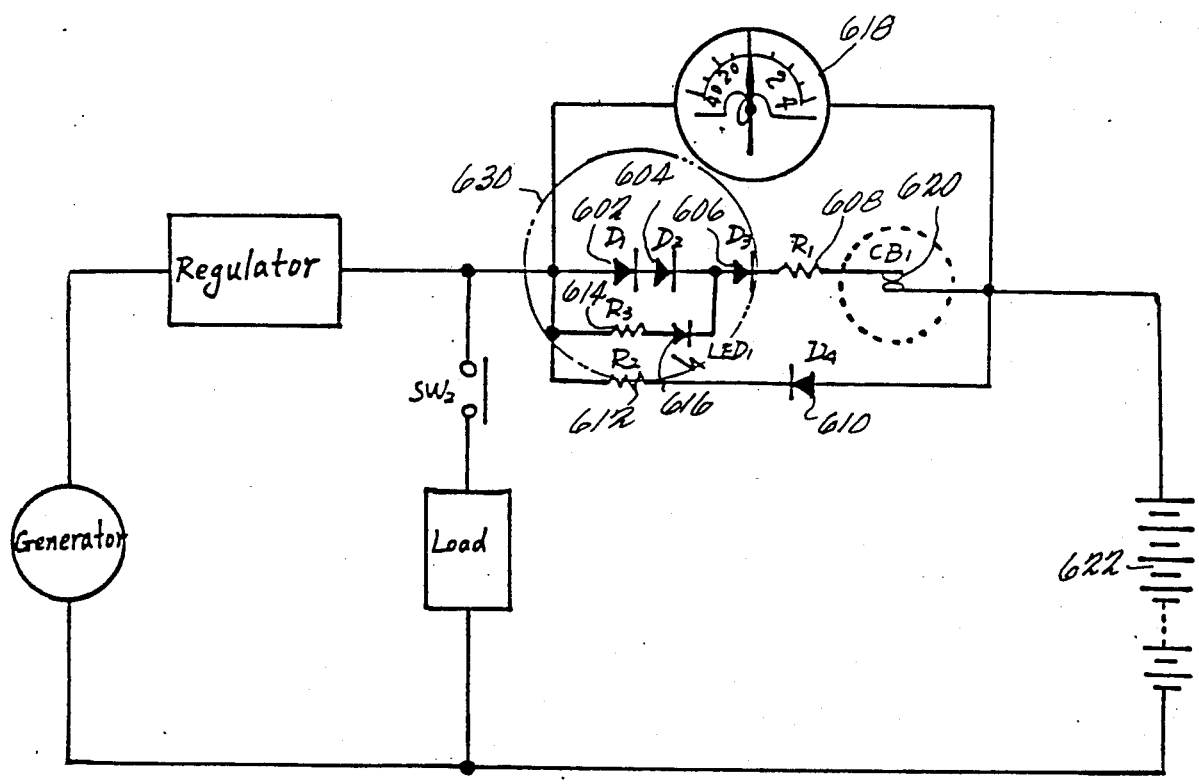

Referring to FIGS. 17 and 17(A), shown is an embodiment of a bi-directional and differential ratio scale meter in accordance with the present invention. A diode set 630 is used for indicating direction and charging protection. Diode set 630 comprises three diodes 602, 604 and 606 which are connected in series together and in series with a charging indication shunt resistor 608. A second network comprising a diode 610 and a resistor 612 are connected in parallel to the network of diodes 602–606 and resistor 608. Diode 610 is connected in reverse polarity with respect to diodes 602, 604 and 606 (which are all connected in the same direction). A protection resistor 614 is connected in series with an indicator light-emitting diode 616. The network of resistor 614 and LED 616 is connected in parallel with diode 602 and 604, with the cathode of diode 616 connected to the cathode of diode 604. During battery charging, diodes 602 and 604 will produce a fixed bias (about 1.4 volts) to drive LED 616, which is protected against reverse voltage by a diode connected in series but in parallel with the bias diode (not shown). The driving bias should be stepped up correspondingly in this connection.

During charging, the network including diode 602, 604 and 606 and resistor 608 is connected in parallel with the coil of a meter 618. Resistor 608 is used as a shunt resistor to provide a higher scale/current ratio. Current breaker 620 is used for protecting battery 622 in case of overcharging. Current breaker 620 may be replaced with a fuse or other protective device. Diode 610 permits current to flow from battery 622 through resistor 612. Resistor 612 and diode 610 are also connected in parallel with the coil of meter 618 to obtain a low scale/current ratio when the battery is delivering current.

The embodiment shown will provide a separate, different scale/current ratio for charging and for discharging of battery 622 in order to avoid the drawback of a lower scale/current ratio of current dipole meter 618 during charging. Further, the embodiment is also provided with a charging indicator and a protective device in order to give a practical indication and protection to the asymmetrical output/input characteristics during long charging periods and instant large discharging periods.

REAR VIEW LAMP

Figures 1, 18:
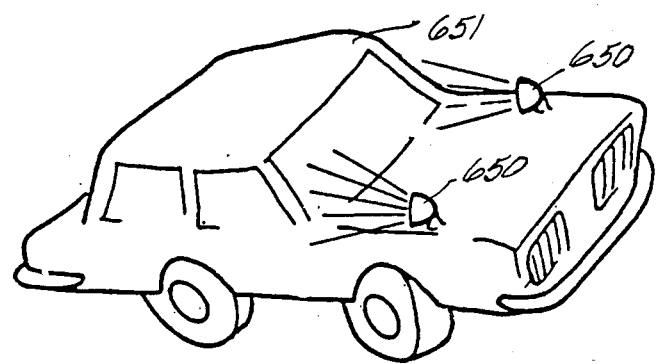
Figures 2, 18:
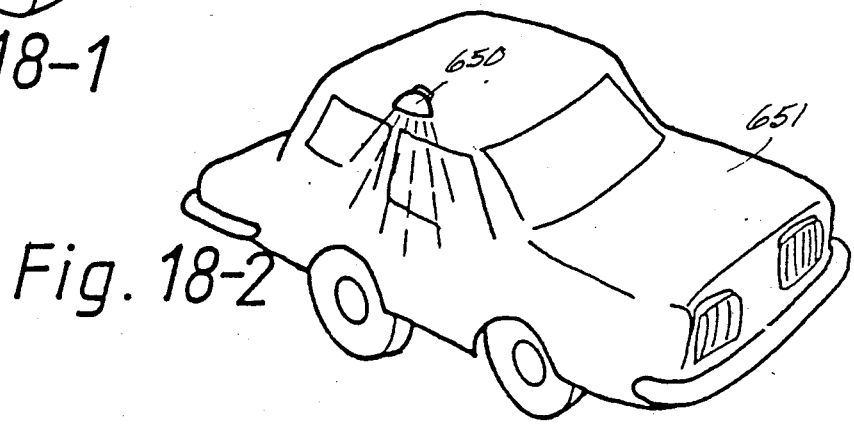
Figures 3, 18:
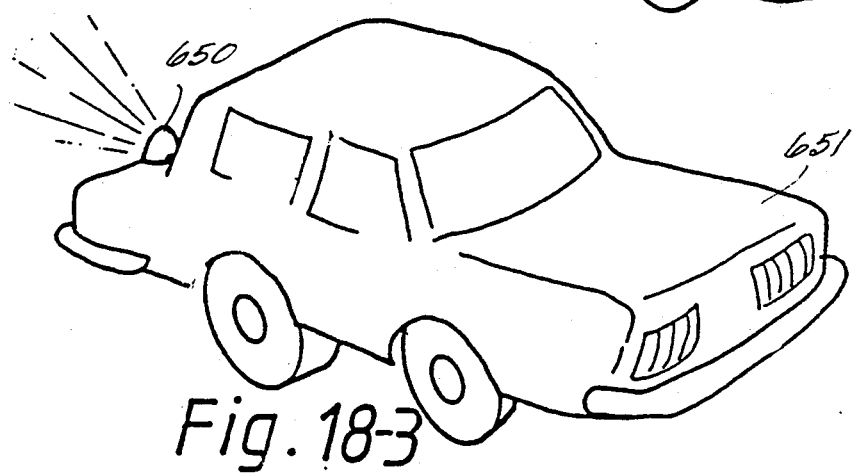
Figures 4, 18:
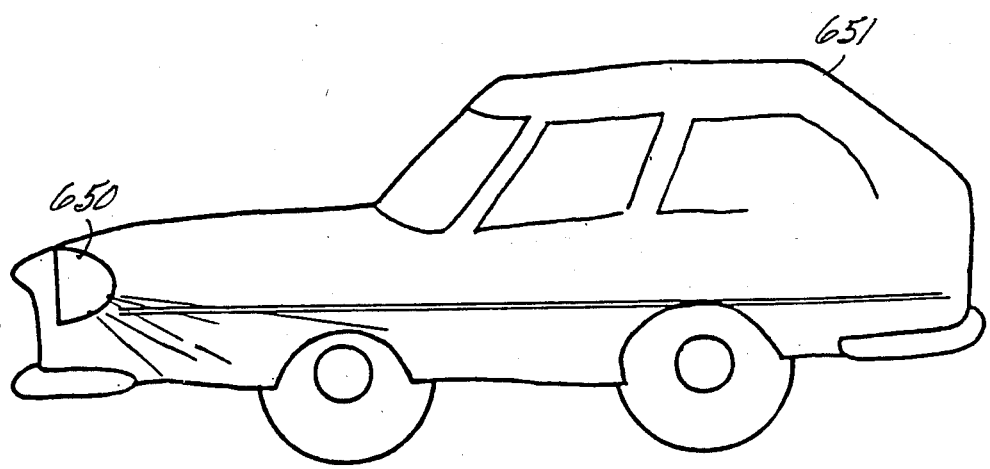

Referring to FIGS. 18-1 to 18-4, various embodiments of car-mounted lamp arrangements are shown. Lamps 650 may be installed at one or both sides of the front of a vehicle 651. Lamps 650 may also be installed at the rear of vehicle 651. Lamp 650 may be controlled by a manual or automatic dimmer switch (not shown) and may be used for a variety of lighting uses, such a parking or reversing vehicle 651 to enable to driver to see spaces to the side and the rear of the vehicle.

Lamps 650 may be controlled with a manual switch. Alternatively, lamps 650 may be controlled by an automatic dimmer switch so that as soon as the driving lamp is changed into a head light, the rear view lamps will be turned on.

Referring to FIGS. 19-1 to 19-2, shown are embodiments of the lamps 650 shown in FIGS. 18-1 to 18-4. Rear view lamps may be obtained by utilizing a large lamp 650 which can throw part of its light backwards, such as a headlight with a reflector having a light-throwing slot or the like.

The embodiment of the lamps shown in FIG. 19-1 includes a cover 701 to which is attached a fixed front lid 702 and a core 703. A transparent cover 704 is located at the lower rear side of cover 701. A lamp core 705 provides illumination. The lamp is mounted on a fixed support 706.

When operating the dip switch (not shown), either the driving lamp or the headlight will have a portion of its light thrown backwards through a slot (covered by transparent cover portion 704) in order to let the driver see the rear and side part of the vehicle.

MOVEABLE MULTI-LAYER EXTENSION CAR TOP

An embodiment of an extension car top in accordance with the present invention is shown in FIGS. 20-1 to 20-2. A car top in accordance with the present invention includes 2 or more layers between which is provided a ventilation passage in order to prevent high temperature produced by sunlight incident on the car top from being transferred to the interior of the car. One of the layers may be a movable rain-proof piece 714 which may slide back and forth on a sliding rail 711 (or alternatively, may slide by means of a rolling wheel coupled to the sliding rail on the fixed layer of the top ). The sliding layer 714 may be slided manually, electrically, pneumatically, or hydraulically, and may be equipped with a lock to lock it into position.

When car 715 is driven in the rain at a suitable speed, sliding top 714 not only shields the car from the rain, but also can protect front windshield 716 from the rain, thus, preventing the driver's vision from being blurred.

Fixed sliding rail 711 may be a general sliding rail for rectilinear sliding motion, or alternatively, a rolling wheel configured to make a straight displacement. A driving and lock mechanism 712 may be manual, electric, pneumatic, or hydraulic as shown in FIGS. 20-3 and 20-4.

OPTICAL FIBER LIGHT MONITOR SYSTEM

An embodiment of an optical fiber light monitor system in accordance with the present invention is used for monitoring the light operation conditions of a car. The light monitor system may comprise one or more optical fiber cords, one end of which is coupled to a light source to be monitored and the other end of which is coupled to a display device within the car for indicating the light output state. Conventional light display systems utilize a pilot light connected in series with a load, which have the disadvantage of high cost as well as difficulty in installation. The light monitor system in accordance with the present invention is designed to use an optical fiber coupler comprising one or more optical fiber cords coupled to the light source. Display in the driver's cab may be either in graphs or in letters.

A MULTI-VOLTAGE D.C. POWER SUPPLY CIRCUIT

Figure 21:
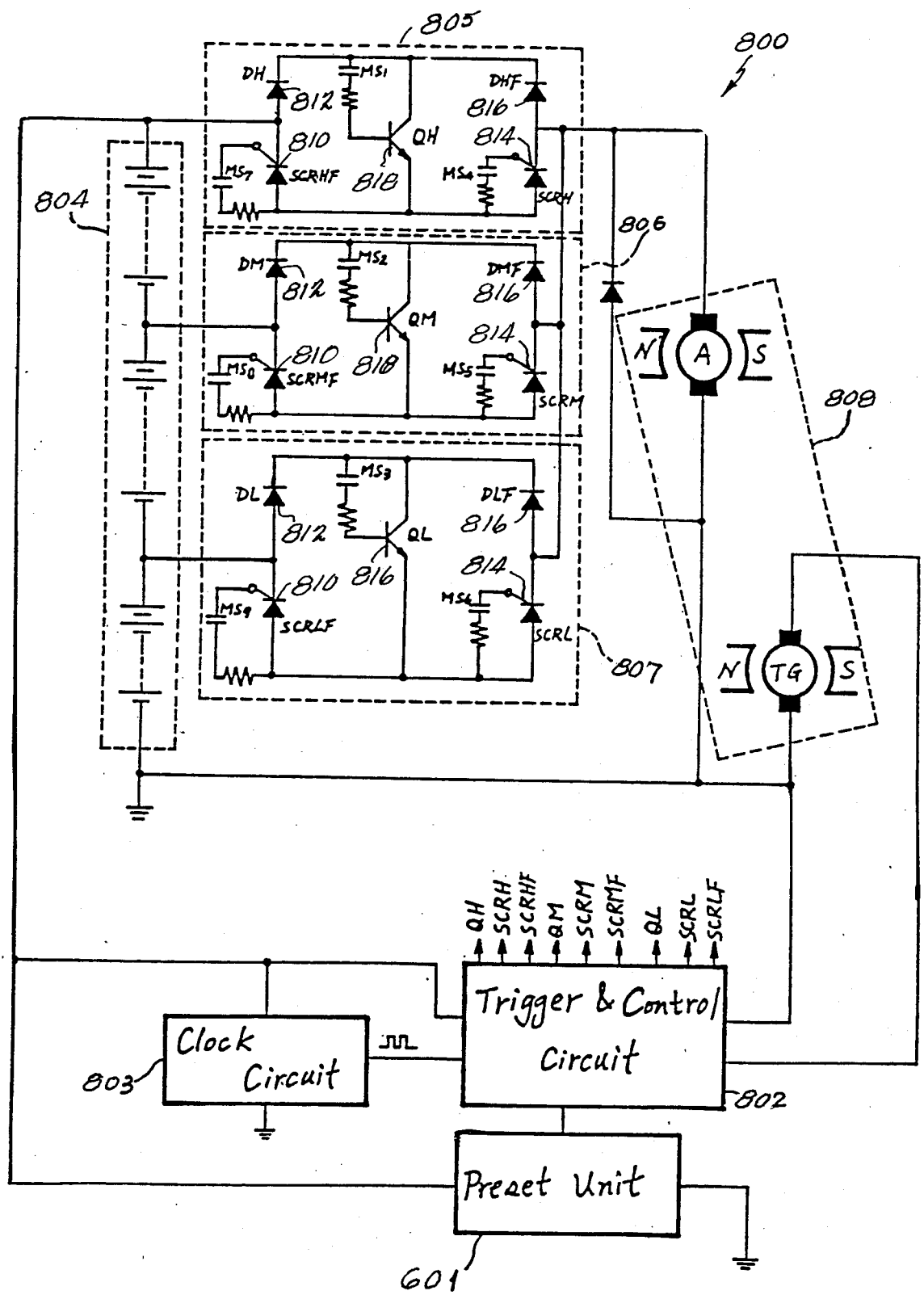
FIG. 21 is a schematic diagram of an embodiment of a multi-voltage direct current power supply circuit in accordance with the present invention.

The presently preferred embodiment of a multi-voltage D.C. power supply circuit 800 in accordance with the present invention to be used in conjunction with the multi-driving system shown in FIGS. 1 and 2, with a generator or driving power unit, with a D.C. driving motor, or for some other purpose, is shown in FIG. 21. The power supply circuit 800 includes two or more sets of D.C. power supplies 804 to provide different voltage having common grounds. The tap terminals of each output voltage is connected in series to a bridge-type switching element assembly 805-807. Through the operation of a preset unit 801, a trigger and control circuit 802 and a time sequence circuit control 803, various switching elements may be changed to "on" or "off" for preset periods of time so as to vary the output rms values for obtaining lower ripple echelon-type D.C. voltage outputs.

Preset unit 801 comprises a conventional digital or analog device using electric or electronic elements for presetting output voltage or current. Preset unit 801 is connected to trigger and control circuit 802, which is a control circuit (comprising conventional electric, electronic or microcomputer elements) for controlling solid state or electric switching elements, as well as controlling bridge-type switching element assembly 805, to deliver driving output and regenerated power feedback.

A clock circuit 803 (comprising conventional electric and electronic elements) produces time sequence pulses and generates an output voltage to monitor the cycles so as to control the trigger and control circuit 802 to yield a corresponding output.

A storage battery set 804 has many tap terminals, and the armature hour ratings of each voltage echelon which it includes may be determined by the rate of usage.

Switching element assembly 805 is connected in series to the various voltage taps of storage battery set 804. Switching element assembly 805 is a bridge circuit comprising a thyristor 814 and a diode 812 use for driving, and a thyristor 814 and diode 816 use for feedback. The point at which the feedback thyristor 810 and driving diode 812 connect is connected to the highest output voltage terminal of stored battery set 804. The point at which driving thyristor 814 and feedback diode 816 connect is connected to the armature of a load motor 808. The positive terminal of the output connection point of the two diodes 812 and 816 is connected to the collector of an NPN switch transistor 818, the emitter of which is connected to the anode common connecting point of thyristors 810 and 814 in order to accept triggering control from the trigger and control circuit 802.

Switching element assemblies 806 and 807 have the same structure as that of switching element assembly 805, and are connected to lower output taps of storage battery set 804 in order to accept control. The number of switching element assemblies installed may be varied depending upon the number of taps of storage battery set 804.

Figure 22:
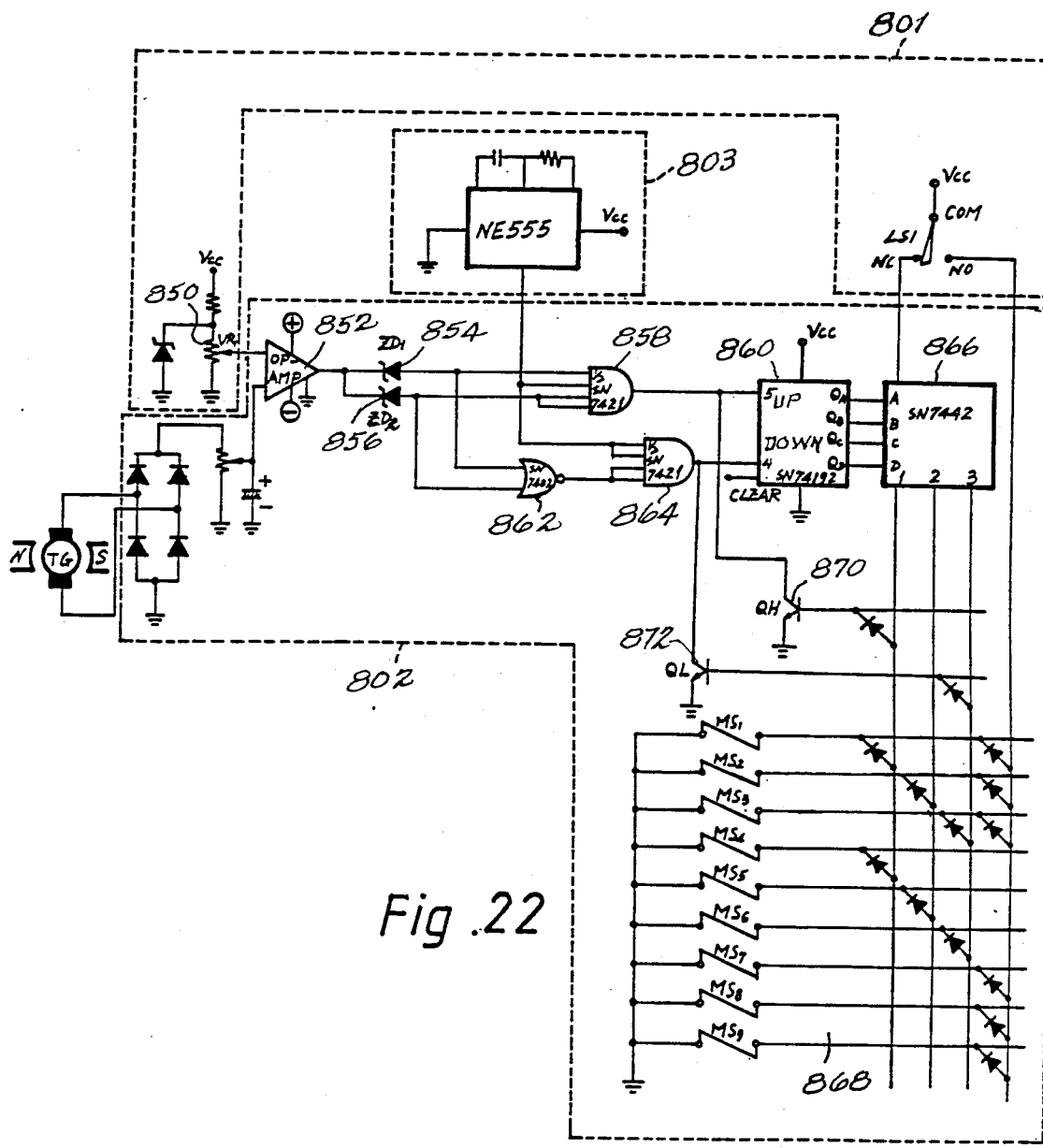
FIG. 22 is a schematic diagram of the trigger and control circuit block and the preset unit block shown in FIG. 21.

Referring to FIG. 22, a detailed schematic diagram of the preset unit 801, trigger and control circuit 802 and clock circuit 803 shown in FIG. 21 is shown.

An operational amplifier 852 is used to compare the feedback voltage of the speed sensing generating of the motor feedback generator with a preset potential on a potentiometer 850. Operation amplifier 852 amplifies the output and delivers it to two zener diodes 854 and 856, which have different selected voltages. The output terminals of zener diodes 854 and 856 and the output of clock circuit 803 (which suitably comprises an NE555) are all coupled to the inputs of an AND gate 858 (suitably an SN7421), the output of which is coupled to the up input of an up/down counter 860 (suitably an SN74192). The output signal of zener diodes 854 and 856 is also coupled to the input of a NOR gate 862 (suitably an SN7402), the output of which is connected along with the output of clock circuit 803 to an AND gate 864 (suitably an SN7421). The output of AND gate 864 is connected to the down input of counter 860.

When the system is turned on, counter 860 receives a clear instruction and resets to zero. When counter 860 receives an input, it performs up/down counting. The output of counter 860 is connected to a decoder 866 (suitably an SN7442), which converts the input binary signal into a decimal signal that is coupled to a driving matrix 868. The input terminals on the ground terminal of counter 860 are respectively connected in parallel to signal short-circuit transistors 870 and 872 in order to limit the voltage adjustment scope for driving switch element assemblies 805, 806 and 807 (shown in FIG. 21) to conduct corresponding driving.

Referring to FIGS. 21 and 22, the feedback signal of the feedback speed of the sensing generator is compared with a preset voltage furnished to operation amplifier 852 by potentiometer 850. Operational amplifier 852 will generate an outoput voltage higher than the zener voltages of zener diodes 854 and 856 when the feedback signal of the feedback speed sensing generator is higher than the preset voltage. When a clock signal appears at the output of clock circuit 803, a signal will be provided on the UP terminal of counter 860 by AND gate 858 to generate a position pulse to cause counter 860 to count up. Decoder 866 will, through driving matrix 868, cause an appropriate one of switching element assemblies 805, 806 and 807 to select its corresponding output tap from battery storage set 804. As counter 860 counts up, a higher voltage tap will be selected.

When the output of operational amplifier 852 is lower than the zener voltage of zener diode 856 but higher than the zener voltage of zener diode 854, counter 860 will count neither up nor down.

Figure 23:
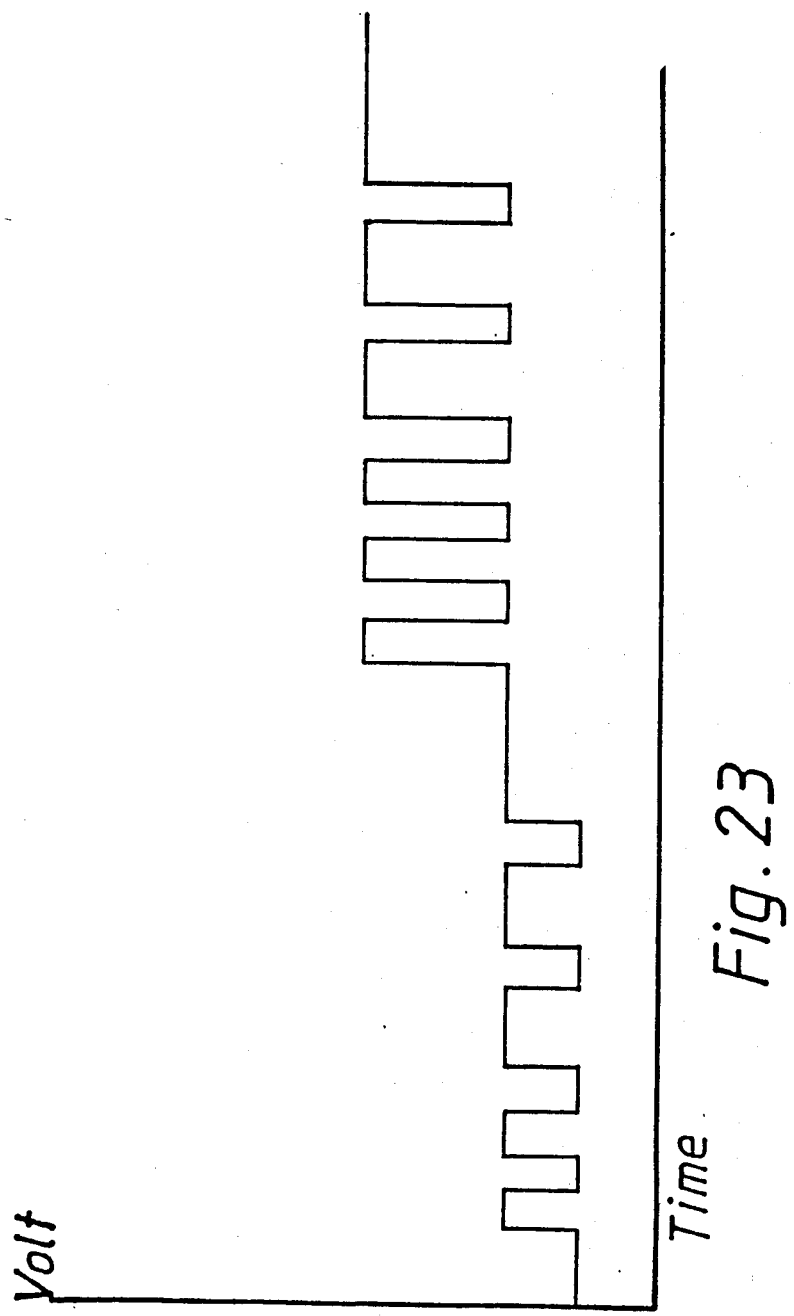
FIG. 23 is a graphical illustration of the voltage output of the circuit shown in FIG. 21.

When the output of operational amplifier 852 is lower than the zener voltages of both zener diodes 854 and 856 (i.e. the reference voltage is higher than the feedback signal from the feedback speed sensing generator), the output of NOR gate 862 goes high. When a clock signal is generated by clock circuit 803, the outout of AND gate 864 goes high, causing counter 860 to count down. When counter 860 counts down, a switching element assembly 805, 806 and 807 corresponding to a lower voltage tap of battery storage set 804 is selected through decoder 856 and driving matrix 868. Referring to FIG. 23, an output voltage wave form produced by th circuit shown in FIG. 22 is shown.

It is also possible to install a switch LS1 (not shown) to a brake device which will operate when a brake is applied. The normally closed contacts of switch LS1 are connected between the power supply and decoder 866, while the normally open contacts of switch LS1 are connected between the power supply and the input terminal of the regenerated brake input line of driving matrix 868. The output of driving matrix 868 may simultaneously drive the thyristors 810 for feedback, and switching transistors 818 to generate charging feedback.

While the invention has been described in connection with what is presently considered to be the most practical and preferred embodiments, it is to be understood that the invention is not to be limited to the disclosed embodiments but on the contrary, it is intended to cover various modifications and equivalent arrangements included within the spirit and scope of the appended claims which scope is to be accorded the broadest interpretation so as to encompass all such modifications and equivalent structures.

I claim:

1. An automotive charging circuit comprising:
   a generator including a field winding and n stator windings;
   energy storing means for applying current to said field winding; and
   n voltage regulating means, each associated with one of said n stator windings, respectively, each of said voltage regulating means for selectively coupling the stator winding associated therewith to a load in response to a voltage differential between said associated stator winding and a load voltage being of a predetermined amount.

2. A charging circuit as in claim 1 wherein each said voltage regulating means includes:
   means for providing a reference voltage;
   means for comparing said reference voltage to a voltage produced by said associated stator winding; and
   switching means for connecting said associated stator winding to said energy storing means in response to the comparison of said comparing means.

3. An automotive regulator circuit comprising:
   a generator stator winding having first and second terminals;
   a thyristor having an anode, a cathode and a gate, the thyristor anode connected to said stator winding first terminal;
   a first resistor, one terminal of which is connected to said stator winding first terminal;
   a second resistor connected between the thyristor cathode and a load;
   energy storing means connected between said stator winding second terminal and said load;
   a zener diode having an anode and a cathode, the zener diode anode connected to said thyristor gate;
   a potentiometer having first and second terminals and a wiper terminal, said zener diode cathode connected to said wiper terminal, a further terminal of said first resistor connected to said potentiometer first terminal, said potentiometer second terminal connected to said stator winding second terminal; and
   a further zener diode connected across said potentiometer first and second terminals.

4. A regulating circuit as in claim 3 further including:
   a generator field winding; and
   a diode connected between the field winding and said stator winding first terminal.

5. A generator with multiple output windings for charging a load, comprising:
   a plurality n of output windings, each of which produce an electrical power signal;
   a plurality n of switch means, each switch means associated with one of said plurality of output windings and having first and second terminals, said first terminal being coupled to said electrical power signal of said associated output winding, and each switch means having a control terminal, each said switch means for selectively allowing conduction between said first and second terminals in response to a switching signal being applied to said control terminal;
   a plurality n of control means, each said control means being coupled to an associated switch means and an associated one of said output windings, for sensing a parameter of said electric power signal produced by said associated output winding, and for producing said control signal to said associated switch means when said parameter of said electrical power signal satisfies a predetermined relationship with a reference.

6. An apparatus as in claim 5 wherein each said control means includes potentiometer means, having a first terminal coupled to said first terminal of said associated switch means, a second terminal coupled to said second terminal of said associated switch means, and a wiper terminal, coupled to said control terminal of said associated switch means.

7. An apparatus as in claim 6 further comprising a zener diode coupled between said wiper terminal and said control terminal.

* * * * *